(12) United States Patent
Yamamoto

(10) Patent No.: US 9,621,856 B2
(45) Date of Patent: Apr. 11, 2017

(54) IMAGE PROCESSING APPARATUS AND IMAGE PROCESSING METHOD

(71) Applicant: CANON KABUSHIKI KAISHA, Tokyo (JP)

(72) Inventor: Takahisa Yamamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 304 days.

(21) Appl. No.: 13/909,270

(22) Filed: Jun. 4, 2013

(65) Prior Publication Data
US 2013/0329035 A1   Dec. 12, 2013

(30) Foreign Application Priority Data

Jun. 11, 2012 (JP) ................................. 2012-132248

(51) Int. Cl.
  *H04N 7/18* (2006.01)
  *B25J 13/08* (2006.01)
  *G06T 7/00* (2017.01)

(52) U.S. Cl.
  CPC ............... *H04N 7/18* (2013.01); *B25J 13/08* (2013.01); *G06T 7/0048* (2013.01); *G06T 2207/20076* (2013.01); *G06T 2207/30164* (2013.01)

(58) Field of Classification Search
  CPC ............ B25J 13/08; G06T 2207/20076; G06T 2207/30164; G06T 7/0048; H04N 7/18
  USPC ........................................................ 348/86
  See application file for complete search history.

(56) References Cited

U.S. PATENT DOCUMENTS

2004/0019405 A1* 1/2004 Ban .................... B25J 9/1697
                                                        700/213
2007/0276539 A1   11/2007 Habibi et al.

FOREIGN PATENT DOCUMENTS

| CN | 101733746 A | 6/2010 |
|----|-------------|--------|
| EP | 1043642 A   | 10/2000 |
| EP | 1385122 A   | 1/2004 |
| JP | H06-243251 A | 9/1994 |
| JP | 3300092 B   | 7/2002 |
| JP | 2004-050390 A | 2/2004 |
| JP | 2007-245283 A | 9/2007 |
| JP | 04238256 B2 | 3/2009 |

(Continued)

OTHER PUBLICATIONS

Great Britain Search Report issued in corresponding application No. 1310100.1 issued on Nov. 29, 2013.

(Continued)

*Primary Examiner* — Jamie Atala
*Assistant Examiner* — James Boylan
(74) *Attorney, Agent, or Firm* — Carter, DeLuca, Farrell & Schmidt, LLP

(57) ABSTRACT

A structure is provided which reduces erroneous estimation when a state of a work is estimated. An image processing apparatus includes: a camera which inputs an image of a work; a work state estimation unit which estimates a state of the work from the image which has been input by the camera; an occurrence probability storage unit which stores an occurrence probability that is previously associated with each state of the work; and a reliability calculation unit which calculates reliability for the estimated state of the work, based on the state of the work estimated by the work state estimation unit and the occurrence probability which corresponds to the state of the work.

19 Claims, 15 Drawing Sheets

(56) References Cited

FOREIGN PATENT DOCUMENTS

| JP | 2010-186219 A | 8/2010 | |
|---|---|---|---|
| JP | WO 2011105134 A1 * | 9/2011 | ........... G06T 7/0046 |
| WO | 2011/105134 A | 9/2011 | |
| WO | 2012/046426 A1 | 4/2012 | |

OTHER PUBLICATIONS

Chinese Office Action issued in corresponding application No. 201310228233.2 on Nov. 3, 2015.
Office Action issued in corresponding Japanese Application No. 2012-132248 on Apr. 26, 2016.
Office Action issued in corresponding Japanese Application No. 2012-132248 on Nov. 15, 2016.
"Statistical basic knowledge, a character mapping homepage", http://www.genstat.net/statistics.html, Nov. 2, 2016.

* cited by examiner

FIG. 6

| INDEX OF ESTIMATION RESULT | ESTIMATED POSITION INFORMATION | | ESTIMATED ORIENTATION INFORMATION | | | SCORE |
|---|---|---|---|---|---|---|
| | LATERAL POSITION X | VERTICAL POSITION Y | LATITUDE $\alpha$ | LONGITUDE $\beta$ | IN-PLANE ANGLE $\gamma$ | |
| 1 | X1 | Y1 | $\alpha$1 | $\beta$1 | $\gamma$1 | V1 |
| 2 | X2 | Y2 | $\alpha$2 | $\beta$2 | $\gamma$2 | V2 |
| ⋮ | | | | | | |
| n | Xn | Yn | $\alpha$n | $\beta$n | $\gamma$n | Vn |

FIG. 8

| INDEX OF ORIENTATION | OCCURRENCE PROBABILITY |
|---|---|
| P_1 | Prob_1 |
| P_2 | Prob_2 |
| ... | ... |
| P_m | Prob_m |

IMAGE PROCESSING APPARATUS AND IMAGE PROCESSING METHOD

BACKGROUND OF THE INVENTION

Field of the Invention

The present invention relates to a technology which is used when a component (work) placed in a predetermined state such as an irregular state is picked. The present invention particularly relates to a technology which is used when works placed in a predetermined state are photographed by a camera or the like, the positions and/or orientation of each of the works are estimated from the photographed images and the works are picked.

Description of the Related Art

The following techniques are investigated as a technique for photographing works which have been placed in a predetermined state with a camera or the like, and estimating the positions and/or orientations of each of the works from the photographed images at high speed.

In Japanese Patent Application Laid-Open No. 2007-245283, when the orientation of the work is estimated, the orientation is selected from among a plurality of stable orientations which have been limited, and thereby the reduction of a processing time is intended.

In Japanese Patent Application Laid-Open No. 2010-186219, stability is calculated for each orientation of the work, a template is not used which expresses an orientation having low stability, and thereby the reduction of a processing time is intended.

In Japanese Patent No. 3300092, a value is stochastically predicted which a parameter for previously determining the positions and/or orientation of the work can assume, an operation range in the image and a parameter space range are specified, and thereby the enhancement of the efficiency of an operation is intended.

In order to sequentially pick a work from the works which have been placed in a predetermined state such as an irregular state by a robot, it is necessary to accurately estimate the positions and/or orientations of the works.

The technique of Japanese Patent Application Laid-Open No. 2007-245283 limits the estimated orientation of the work to the vicinity of the stable orientation. Accordingly, the technique cannot accurately estimate the orientation of a work, which has been greatly displaced from a supposed stable orientation. There occurs a problem, for instance, when an orientation has occurred which has been greatly displaced from the stable orientation due to such a cause that works overlap each other or the like. In addition, the technique of Japanese Patent Application Laid-Open No. 2007-245283 does not consider the probability (occurrence probability) that the orientation occurs, for each stable orientation, and accordingly cannot reduce erroneous estimation for the orientation by using the occurrence probability.

In addition, in Japanese Patent Application Laid-Open No. 2010-186219, the stability of the orientation is used when a template is formed, but the stability is not used in order to obtain an accurate estimation result of the orientation. Accordingly, it is not considered to reduce erroneous estimation of the orientation by using the stability for the estimation of the orientation.

In addition, in Japanese Patent No. 3300092 as well, the value is stochastically predicted which a parameter for previously determining the positions and/or orientations of the work can assume but it is not considered to reduce erroneous estimation of the orientation by using the prediction.

SUMMARY OF THE INVENTION

The present invention is designed with respect to such problems, and an object of the present invention is to provide such a mechanism as to achieve the reduction of erroneous estimation when the state (position, orientation and the like) of a work is estimated.

Further features of the present invention will become apparent from the following description of exemplary embodiments with reference to the attached drawings.

BRIEF DESCRIPTION OF THE DRAWINGS

FIG. 6 is a schematic view which illustrates the first embodiment of the present invention and illustrates one example of the estimation result of a position orientation by the work state recognition processing unit in FIG. 1.

FIG. 8 is a schematic view which illustrates the first embodiment of the present invention and illustrates one example of the occurrence probability that is stored in an occurrence probability storage unit in FIG. 1.

DESCRIPTION OF THE EMBODIMENTS

Preferred embodiments of the present invention will now be described in detail in accordance with the accompanying drawings.

First Embodiment

Figure 1:
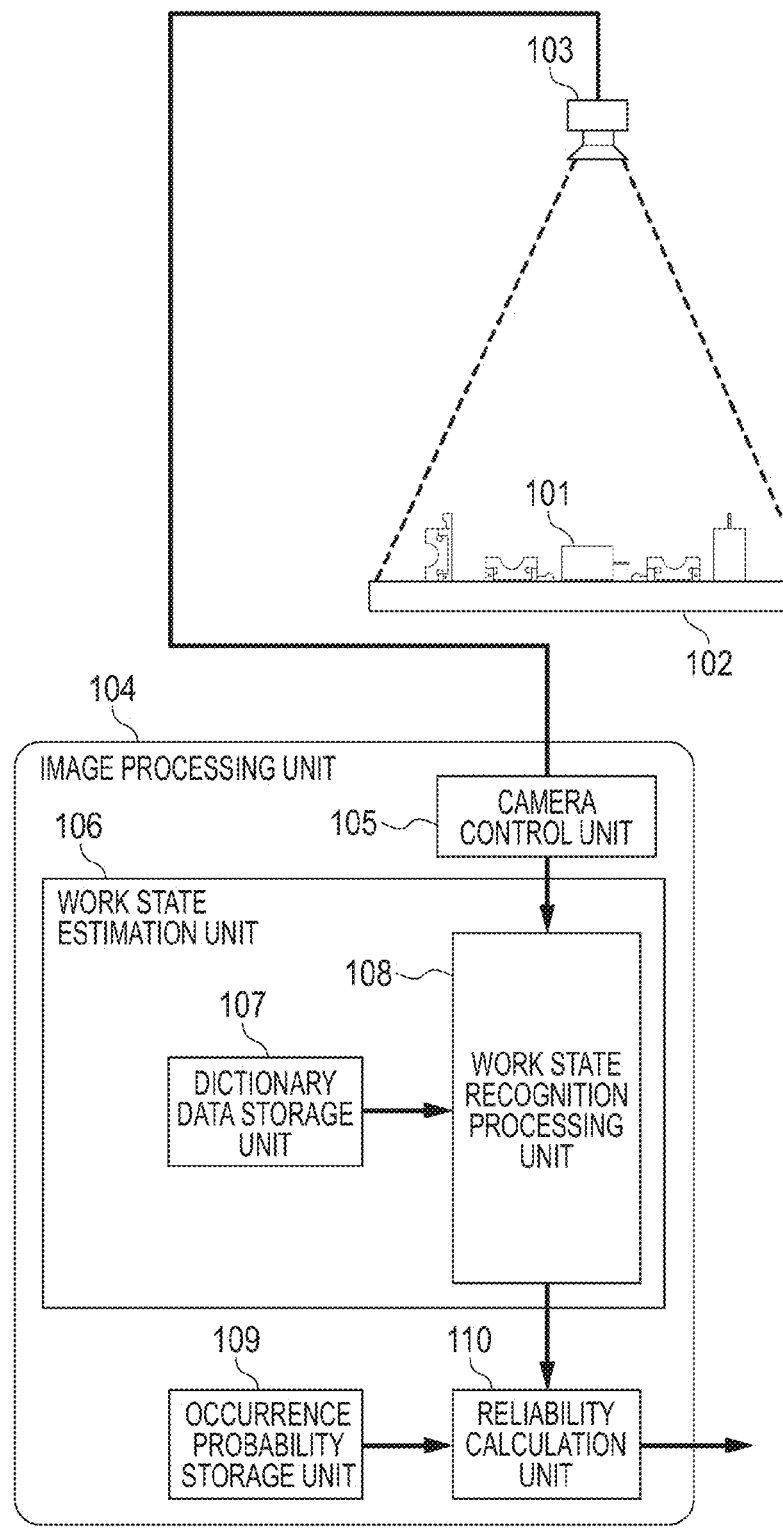
FIG. 1 is a schematic view which illustrates one example of a schematic structure of an image processing apparatus according to a first embodiment of the present invention.

FIG. 1 is a schematic view which illustrates one example of a schematic structure of an image processing apparatus 100-1 according to a first embodiment of the present invention.

FIG. 1 shows a work 101. In the present embodiment, an example in which a position orientation of the work 101 is estimated will be described below. Here, "position orientation" may be considered as "position and orientation".

A tray 102 is shown. Plural works 101 are loaded on the tray 102 in an irregular state. However, in the present embodiment, the works 101 shall not overlap each other. An example of so-called loading in bulk in which the works overlap each other (state in which plural works are untidily placed in a piled state) will be described in a third embodiment.

A camera 103 is shown which is used as an image input unit. The camera 103 is mounted fixedly on the upper part of a frame or under a ceiling in a not-shown system, or the like, and is enabled to photograph the state of the tray 102 and the plural works 101 which are loaded on the tray 102 to generate images (image data).

An image processing unit 104 is shown. The image processing unit 104 includes a camera control unit 105, a work state estimation unit 106, an occurrence probability storage unit 109, and a reliability calculation unit 110, as is illustrated in FIG. 1.

The camera control unit 105 is shown. The camera control unit 105 performs control for taking in the images (image data) which have been photographed by the camera 103.

The work state estimation unit 106 is shown. The work state estimation unit 106 includes a dictionary data storage unit 107 and a work state recognition processing unit 108, as is illustrated in FIG. 1. The work state estimation unit 106 subjects the image which has been photographed by the camera 103 to a predetermined processing that will be described later, and estimates the positions and/or orientations of the plural works 101.

The dictionary data storage unit 107 is shown. The dictionary data storage unit 107 associates the image obtained by photographing the works 101 from all directions as if to wrap the work 101 onto a spherical shape, with orientation information (photographing directions on sphere which wraps work 101, in other words, latitudes and longitudes on sphere), and stores the associated information as dictionary data. However, actually, the images cannot be prepared which have been continuously photographed from all of the directions, and accordingly images of the representative orientations which have been sampled at some degree of intervals result in being stored as dictionary data.

Figure 2:
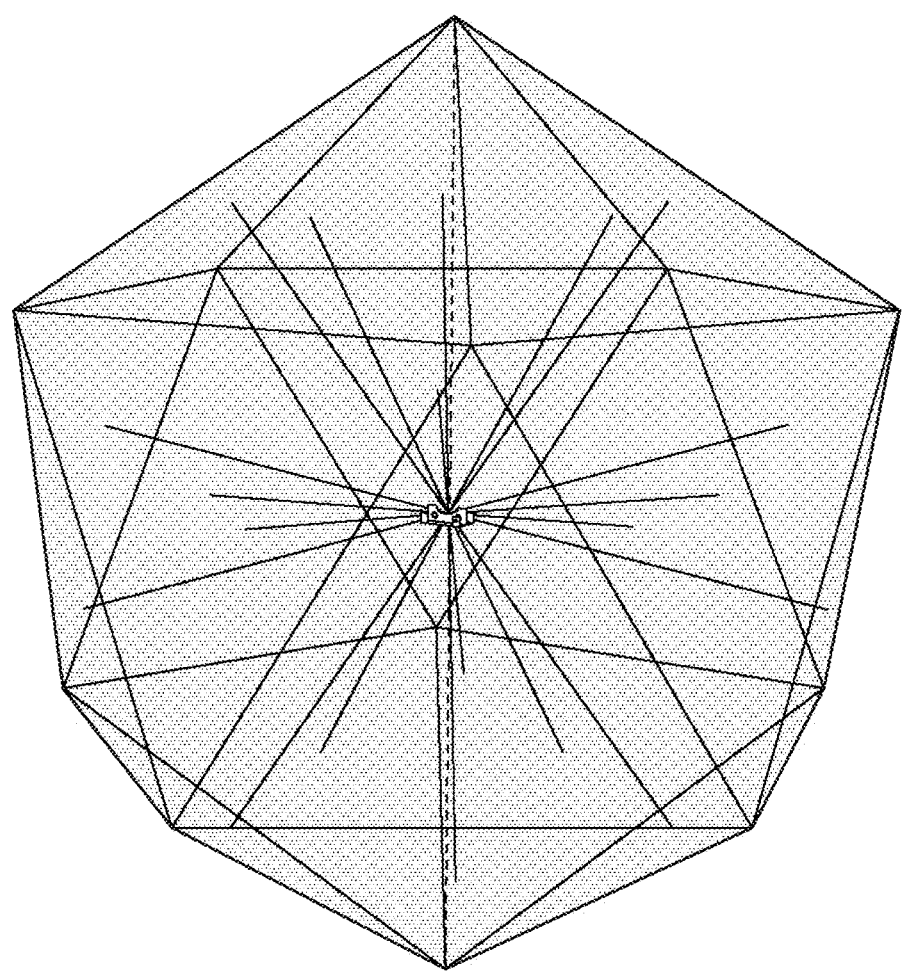
FIG. 2 is a schematic view for illustrating the first embodiment of the present invention and describing a representative orientation.
Figure 3A:
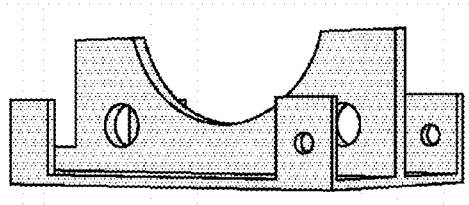
FIGS. 3A, 3B, 3C, 3D and 3E are schematic views which illustrate the first embodiment of the present invention and illustrate the states of works in FIG. 1 in some representative orientations.
Figure 3B:
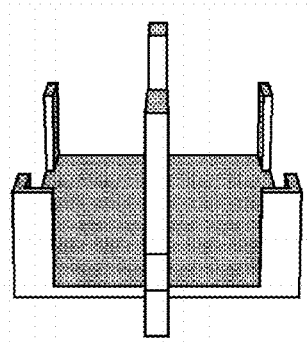
Figure 3C:
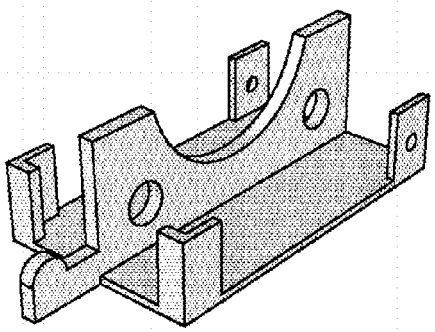
Figure 3D:
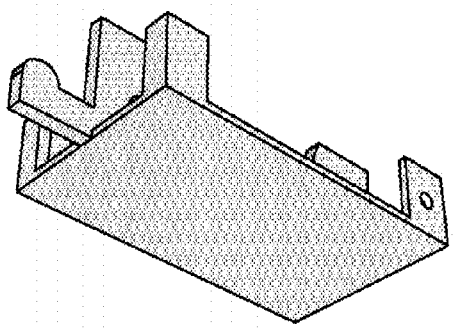
Figure 3E:
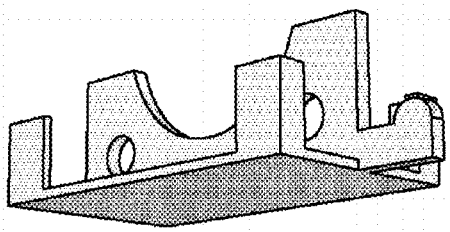

FIG. 2 is a schematic view for illustrating the first embodiment of the present invention and describing a representative orientation.

FIG. 2 illustrates a way of thinking, which is referred to as a geodetic dome. In the present embodiment, a regular icosahedron is basically used as this geodetic dome, and directions (orientations) which have been viewed from each representative point of the regular icosahedron when the work 101 is arranged at this center position are defined as representative orientations. Here, each vertex and each face center point, for instance, can be used as the representative point. In the regular icosahedron, the number of the vertices is 16, the number of the faces is 20, and accordingly the representative orientations which are viewed from 36 directions in total can be defined. Furthermore, in-plane rotation when viewed from the directions also needs to be considered for each of the representative orientations. When the in-plane rotation is distinguished at intervals of every angle of 18 degrees, for instance, 20 orientations of the in-plane rotation exist. Accordingly, in this case, there are 36×20=720 orientations.

FIGS. 3A to 3E are schematic views which illustrate the first embodiment of the present invention and illustrate the states of work 101 in FIG. 1 in several representative orientations.

The work 101 arranged in the irregular state has a possibility of facing in any direction with respect to the camera 103, and further has a possibility of being oriented at any angle in the plane corresponding to the direction. Accordingly, the dictionary data storage unit 107 has the images which have been obtained from all of the directions (in the present embodiment, 36 directions) as dictionary data. The images of the work having rotated in the plane can be easily generated from the image of the representative orientation by using affine conversion processing, and accordingly the dictionary data storage unit 107 may store the images of the works 101 which have been photographed from 36 directions. The images of the work having rotated in the plane may be generated in actual processing.

The description will be returned to that for FIG. 1.

The work state recognition processing unit 108 is shown. The work state recognition processing unit 108 receives an image (image data) from the camera control unit 105, and performs processing for estimating the position orientation of the work in the image.

Figure 4A:
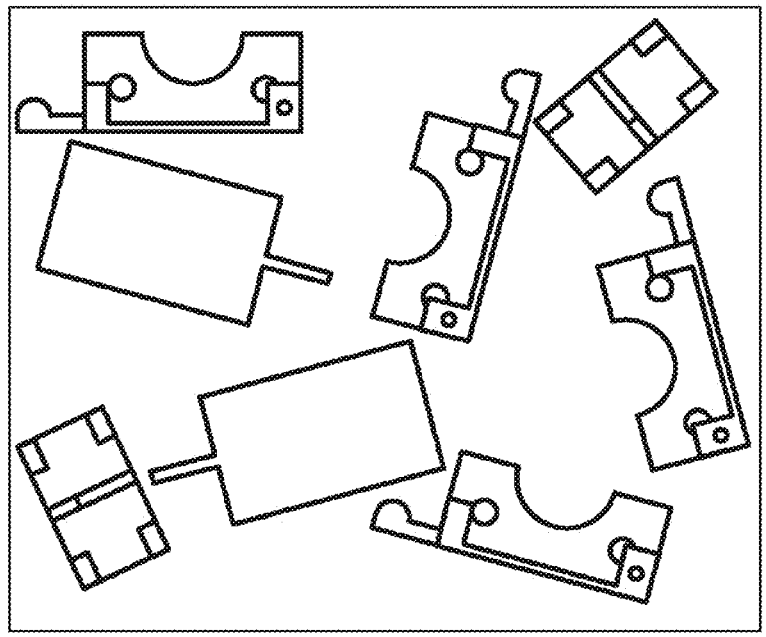
FIGS. 4A and 4B are schematic views which illustrate the first embodiment of the present invention and illustrate one example of an image that has been photographed by a camera in FIG. 1.
Figure 4B:
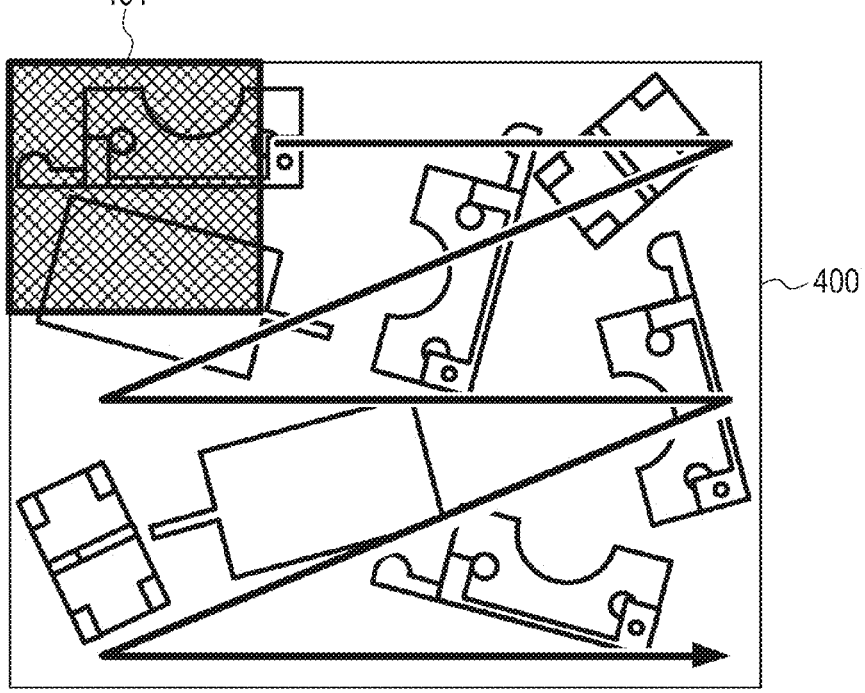

FIGS. 4A and 4B are schematic views which illustrate the first embodiment of the present invention and illustrate one example of an image that has been photographed by the camera 103 in FIG. 1. In FIG. 4A, the plural works 101 which have been irregularly arranged are photographed.

Here, a technique for estimating the positions and/or orientations of the work 101, which is performed in the work state recognition processing unit 108, will be described below with reference to FIGS. 4A and 4B and FIG. 5.

The work state recognition processing unit 108 uses the dictionary data which is stored in the dictionary data storage unit 107, as a template, and performs correlation processing while making the template scan the image (FIG. 4A). The state is illustrated in FIG. 4B. In FIG. 4B, an image (image data) 400 and certain dictionary data (template) 401 are shown.

Figure 5:
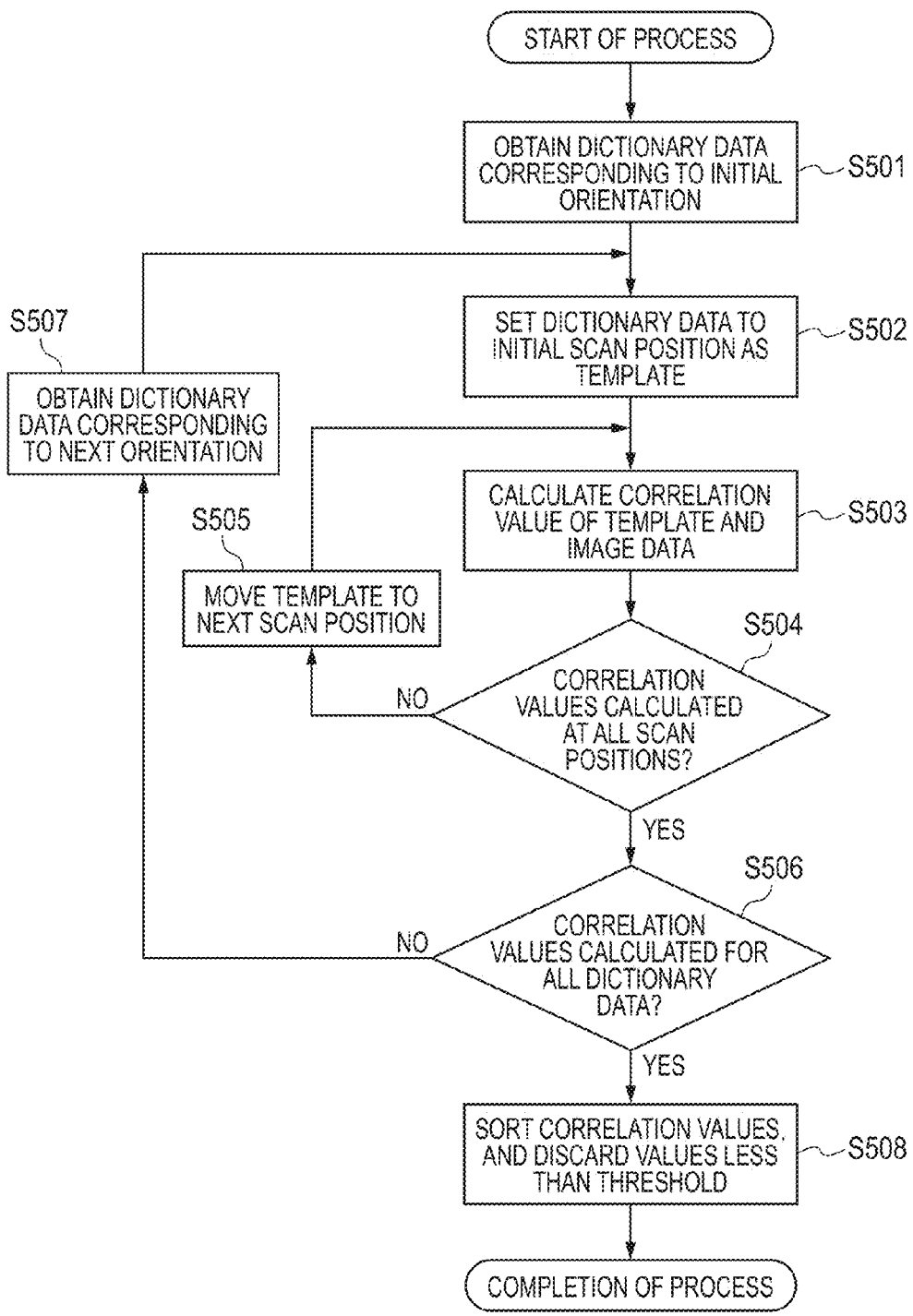
FIG. 5 is a flow chart that illustrates the first embodiment of the present invention and illustrates one example of a procedure of processing which is performed in a work state recognition processing unit in FIG. 1.

The work state recognition processing unit 108 estimates the position and/or orientation of each of the plural works 101 placed in a predetermined state, according to the flow chart illustrated in FIG. 5.

FIG. 5 is a flow chart that illustrates the first embodiment of the present invention and illustrates one example of a procedure of processing which is performed in the work state recognition processing unit 108 in FIG. 1. FIG. 5 will be described below.

Firstly, in a step S501, the work state recognition processing unit 108 obtains dictionary data corresponding to an initial orientation from the dictionary data storage unit 107.

Subsequently, in a step S502, the work state recognition processing unit 108 sets the dictionary data to an initial scan position as the template. In the present embodiment, the template (401) shall be set on an upper left position of the image (400), for instance, as is illustrated in FIG. 4B.

Subsequently, in a step S503, the work state recognition processing unit 108 performs a correlation operation between the template and the image (image data) which are currently set on a predetermined position, and calculates a correlation value. In the present embodiment, the technique of the correlation operation is not especially limited, and accordingly a known technique may be used. The correlation value may be calculated, for instance, by a normalization correlation operation.

Subsequently, in a step S504, the work state recognition processing unit 108 sets the template on all positions in the image, and determines whether the correlation values have been calculated or not.

When the template has not been set on all of the positions in the image yet as a result of the determination in the step S504, the processing advances to a step S505.

When the processing advances to the step S505, the work state recognition processing unit 108 moves the template to a next scanning position, and updates a position on which the template is set. After that, the procedure shifts to the processing of the step S503.

On the other hand, when the template has been set on all of the positions in the image as a result of the determination in the step S504, the processing advances to a step S506.

When the processing advances to the step S506, the work state recognition processing unit 108 sets all of the dictionary data as the template, and determines whether the correlation values have been calculated or not.

When all of the dictionary data have not been set as the template yet as a result of the determination in the step S506, the processing advances to a step S507.

When the processing advances to the step S507, the work state recognition processing unit 108 obtains the dictionary data corresponding to a next orientation from the dictionary data storage unit 107, and updates the dictionary data. In this case, the dictionary data is updated in consideration of the in-plane rotation as well. In other words, the dictionary data (template) stored in the dictionary data storage unit 107 is occasionally converted to new dictionary data by being subjected to affine conversion. For instance, when the in-plane rotation at intervals of every angle of 18 degrees is considered for each of 36 directions as has been described above, 720 dictionary data in total shall be set as the template. After that, the procedure shifts to the processing of the step S502.

On the other hand, when all of the dictionary data have been set as the template as a result of the determination in the step S506, the processing advances to a step S508.

When the processing advances to the step S508, the work state recognition processing unit 108 sorts the correlation values which have been obtained till now, in a descending order, and performs threshold processing for the result. Specifically, in the present embodiment, the correlation values which are less than the threshold value are discarded, and only the correlation values which are the threshold value or more are saved.

The work state recognition processing unit 108 estimates the positions and orientations of the plural works 101 according to the above described procedure of the processing of the steps S501 to S508 in FIG. 5.

FIG. 6 is a schematic view which illustrates the first embodiment of the present invention and illustrates one example of the estimation result of the position orientation by the work state recognition processing unit 108 in FIG. 1.

FIG. 6 is an example in which the estimation results of n pieces of the position orientations are output, and in which the estimated position information (lateral position and vertical position) and the estimated orientation information (latitude and longitude on geodetic dome, and in-plane rotation angle at the position) are each illustrated as the estimation result. In addition, in FIG. 6, a score which is shown for each of the estimation results represents the correlation value which has been calculated by the work state recognition processing unit 108. In FIG. 6, the estimation results of the n pieces of the position orientations are illustrated, but the number is generally different from the number of the works 101. The reason is considered to be because there exists a work of which the orientation fails to be estimated (of which the correlation values result in being low for all templates) depending on a noise, an illumination condition and the like in the photography. The reason is also because there exists a work which outputs high correlation values for a plurality of the orientations, or the work state recognition processing unit 108 occasionally results in outputting a high correlation value to such a position that the work does not exist, for similar reasons.

The work state recognition processing unit 108 outputs the information on the estimation results of the position orientations as illustrated in FIG. 6 to the reliability calculation unit 110.

The description will be returned to that for FIG. 1.

The occurrence probability storage unit 109 is shown. The occurrence probability storage unit 109 stores an occurrence probability which has been associated with every orientation therein. The occurrence probability which has been associated with every orientation can be previously calculated by repeated trials of arranging the work. Because an orientation histogram relating to an occurrence frequency which shows how frequently the orientation has occurred can be created by the repeated trials, the occurrence probability can be calculated based on the orientation histogram.

The procedure of calculation processing for this occurrence probability will be described below with reference to FIG. 7.

Figure 7:
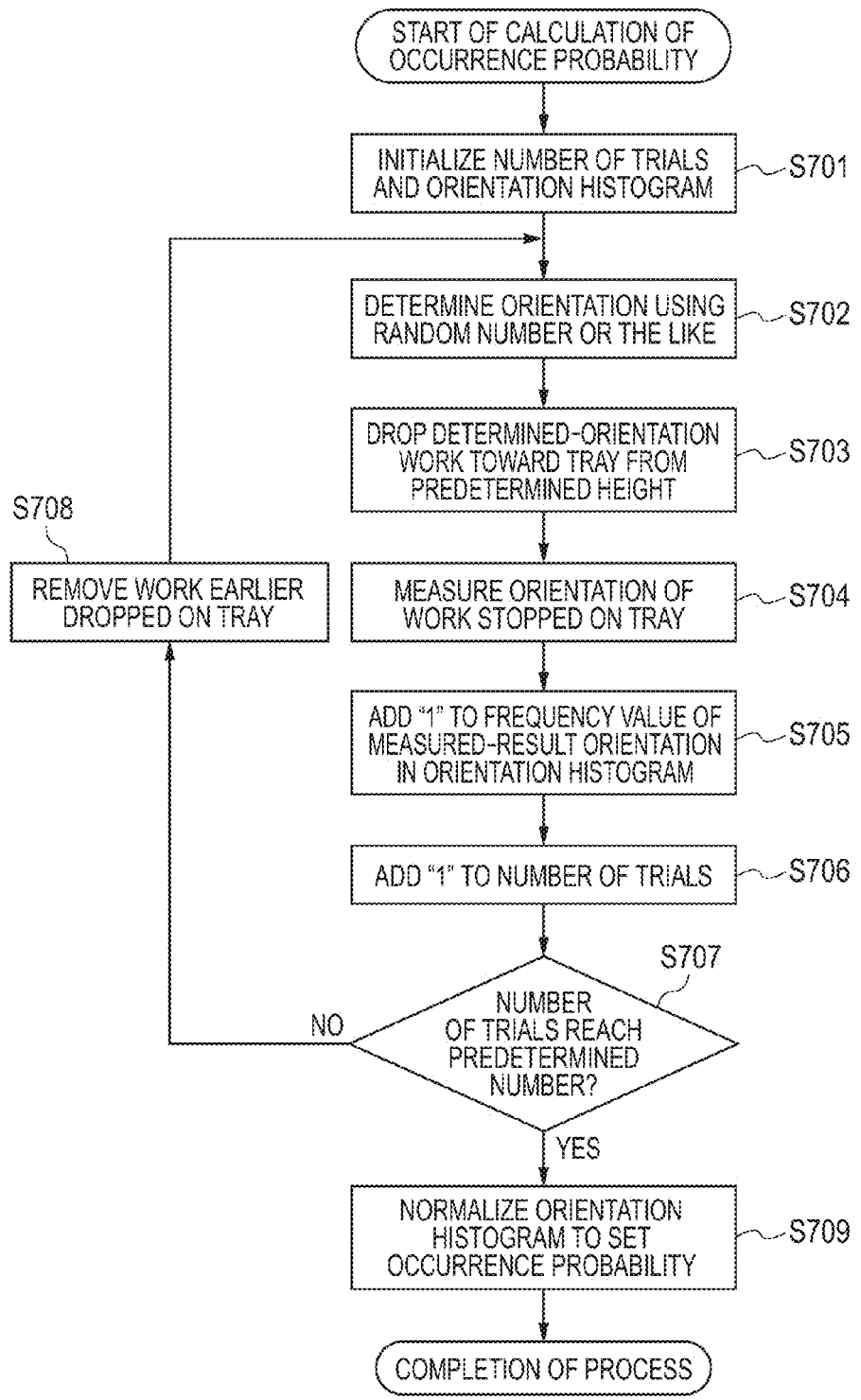
FIG. 7 is a flow chart which illustrates the first embodiment of the present invention and illustrates one example of a procedure of calculation processing for the occurrence probability.

FIG. 7 is a flow chart which illustrates the first embodiment of the present invention and illustrates one example of a procedure of calculation processing for the occurrence probability. FIG. 7 will be described below.

Firstly, in a step S701, the image processing unit 104, for instance, initializes the number of trials to "0", and simultaneously initializes the value of each bin in the orientation histogram to "0"

Subsequently, in a step S702, the image processing unit 104, for instance, randomly selects (determines) the orientation by using the random number.

Subsequently, in a step S703, the work 101 which has the orientation that has been selected in the step S702 is dropped toward the tray 102 from a predetermined height.

When the movement of the work 101 which has been dropped onto the tray 102 has stopped, subsequently in a step S704, the orientation of the work 101 is measured. This orientation may be visually measured by a human. Alternatively, a measurement method may be adopted which uses the above described work state recognition processing unit 108 and determines, for instance, an orientation of which the score has been estimated to be highest as the orientation.

After the measurement of the orientation has ended, subsequently in a step S705, the image processing unit 104, for instance, performs the processing of adding "1" to a frequency value in the bin which is set for the orientation of the measurement result, in the orientation histogram.

Subsequently, in a step S706, the image processing unit 104, for instance, performs the processing of adding "1" to the number of the trials.

Subsequently, in a step S707, the image processing unit 104, for instance, determines whether the number of the trials has reached a predetermined number of times or not.

When the number of the trials has not reached the predetermined number of times as a result of the determination in the step S707, the processing advances to a step S708.

When the processing advances to the step S708, the work 101 which has been dropped onto the tray 102 in the step S703 is removed, the procedure shifts to processing in the step S702, and the trials are repeated. The reason why the work in the tray 102 is removed in this step S708 is because such a case is supposed in the present embodiment that the works 101 are loaded in the irregular state in the tray 102 but the works do not overlap with each other.

On the other hand, when the number of trials has reached the predetermined number of times as a result of the determination in the step S707, the processing advances to a step S709.

When the processing advances to the step S709, the image processing unit 104, for instance, normalizes the obtained orientation histogram (divides frequency value in each bin by number of trials) to obtain the occurrence probability.

The occurrence probability which has been obtained according to the above described procedure of processing in the steps S701 to S709 in FIG. 7 is stored in the occurrence probability storage unit 109 beforehand.

FIG. 8 is a schematic view which illustrates the first embodiment of the present invention and illustrates one example of the occurrence probability that is stored in the occurrence probability storage unit 109 in FIG. 1.

In FIG. 8, in the present embodiment, the orientations shall be 720 types (36 directions×in-plane rotation at angles of every 18 degrees) (m=720). In addition, the index of the orientation and the orientation (in other words, latitude and longitude, and in-plane rotation) correspond to each other one to one.

The description will be returned to that for FIG. 1.

The reliability calculation unit 110 is shown. The reliability calculation unit 110 calculates reliability for the estimated position orientation from information on the estimation results of the position orientations (FIG. 6), which is output from the work state estimation unit 106, and information on the occurrence probability (FIG. 8), which is stored in the occurrence probability storage unit 109. The reliability described here is such an indicator that the higher is the reliability, the less is erroneous estimation. Accordingly, the estimation result of the position orientation, to which high reliability is given, results in indicating a correct position orientation of a certain work at a high rate.

Here, as for a method of calculating the reliability, the following roughly-separated two cases (first case and second case) are considered so as to clarify the description.

The first case is the case where a plurality of orientations is output as the estimation result for the same estimated position from the work state estimation unit 106. In this case, one estimated orientation out of the plurality of the estimated orientations is a true orientation of the work, and the other orientation estimation results are assumed to be the erroneous estimation. Accordingly, an object of the reliability calculation is to set high reliability to an orientation estimation result for the true orientation, and to set low reliability to the orientation estimation result for the erroneous estimation.

The second case is the case where one orientation is output for each of a plurality of estimated positions as the estimation result from the work state estimation unit 106. In this case, it is supposed from the beginning that there are plural works, and accordingly it is expected that there is such orientation estimation results as to correspond to each of the true orientations of the plural works. However, it is considered that the estimation results actually include an orientation estimation result of erroneous estimation, and an object of the reliability calculation is to set low reliability to such an estimation result.

Figure 9A:
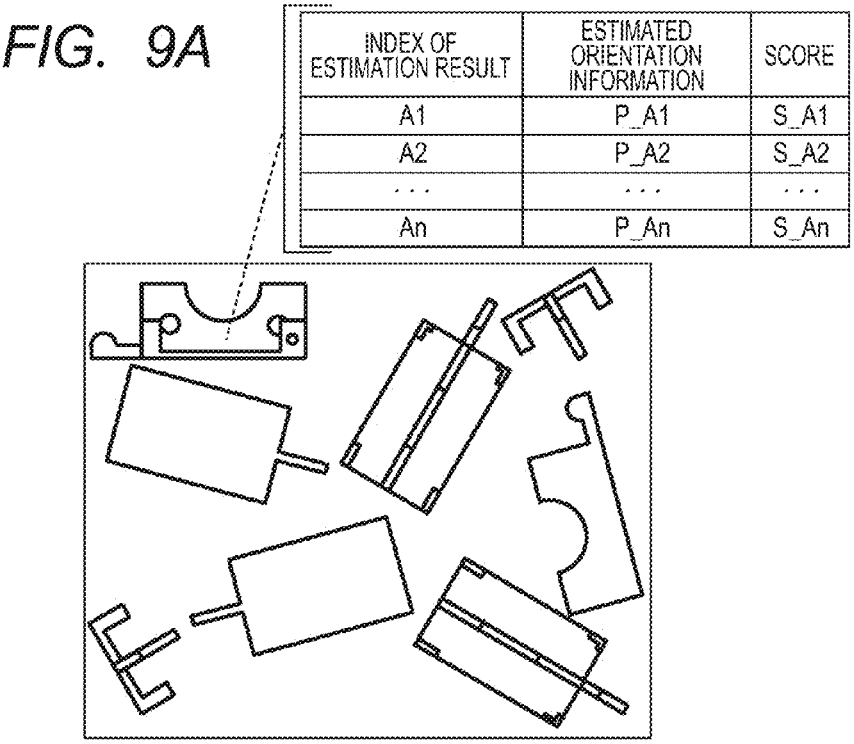
FIGS. 9A and 9B are schematic views which illustrate the first embodiment of the present invention and illustrate one example of the estimation result by a work state estimation unit in FIG. 1.
Figure 9B:
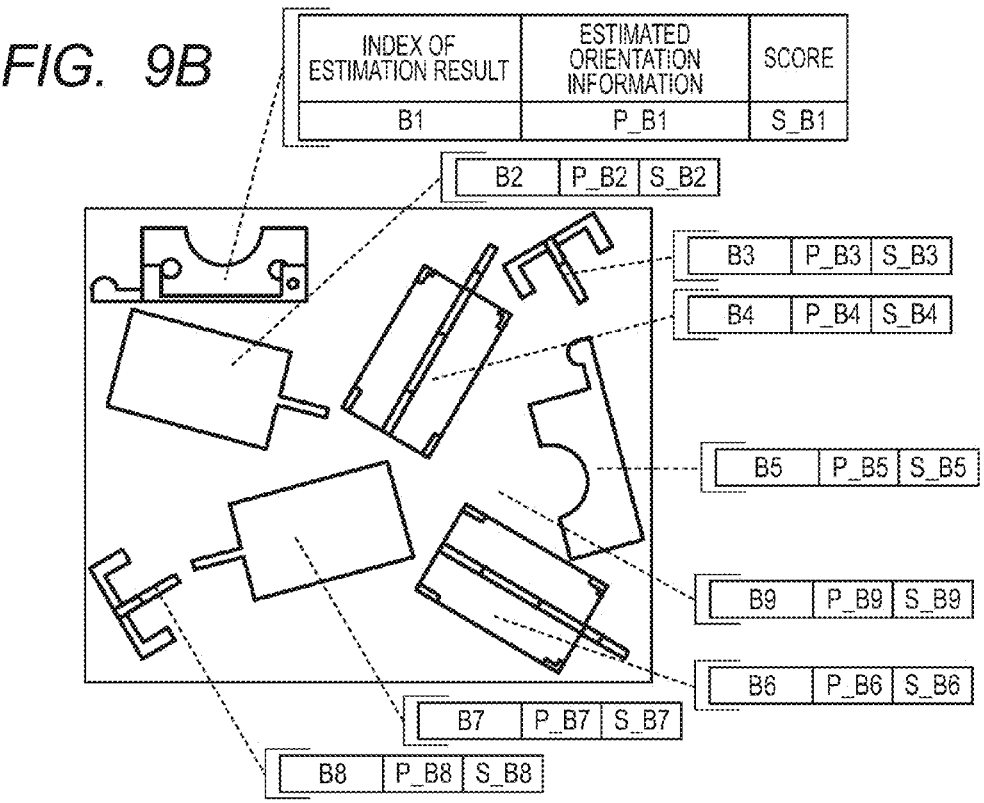

FIGS. 9A and 9B are schematic views which illustrate the first embodiment of the present invention and illustrate one example of the estimation result by the work state estimation unit 106 in FIG. 1.

FIG. 9A illustrates one example of the estimation result by the work state estimation unit 106 in the above described first case. FIG. 9A illustrates the case where n types of orientations are estimated for a work in an upper left position in the image (where orientation estimation results for other works are omitted in the figure). In addition, in FIG. 9A, S_A1, S_A2, . . . and S_An which are shown as scores shall be arranged in a descending order. In this case, such a method is considered as to give high reliability to an orientation having the highest occurrence probability and give low reliability to other orientations. This consideration is based on such a way of thinking that it is natural to estimate that the orientation occurs which is easiest to occur (which has high occurrence probability). For instance, in the case of FIG. 9A, such a technique is considered as to firstly investigate the occurrence probability which corresponds to each of estimated orientations P_A1 to P_An by referring to a table illustrated in FIG. 9A; and as to then set high reliability to the estimated orientation having the highest occurrence probability (for instance, estimated orientation P_A1), and set low reliability to the other estimated orientations (for instance, estimated orientations P_A2 to P_An). Furthermore, it is also considered to calculate the reliability in consideration of not only the occurrence probability but also the score obtained when the orientation has been estimated. For instance, such a method is considered as to give high reliability to an orientation which has the highest occurrence probability out of orientation estimation results having such score values as to be included in a predetermined number of higher order score values, and give low reliability to the other orientations. In addition, such a method is considered as to provide a predetermined threshold value for the score values, give high reliability to the orientation having the highest occurrence probability out of the orientation estimation results having the score values exceeding the threshold value, and give low reliability to the other orientations. Furthermore, a weighted sum of the score value and the occurrence probability may be adopted as the reliability. In this case, as for the weight, it is acceptable to conduct trials by variously changing the values of the weight beforehand, and employ a value of the case which has shown the best performance (where as reliability is larger, result of erroneous estimation decreases).

FIG. 9B illustrates one example of the estimation result by the work state estimation unit 106, in the above described second case. FIG. 9B illustrates the case where the orientations are estimated for 9 positions in the image, respectively. (FIG. 9B illustrates an example in which the estimation result B9 is a result of a place where there is no work, but the erroneous estimation occurs because of a noise or the like.) In this case, such a technique is considered as to set low reliability to the orientation of which the occurrence probability is less than a certain threshold value, and set high reliability to the orientation of which the occurrence probability is the certain threshold value or more. This is based on such a way of thinking as to suspect (to set low reliability to) the estimation result because the orientation having a small occurrence probability should occur as a rare case, and as to relatively trust (to set high reliability to) the result which has been estimated to be an orientation that easily occurs (orientation that has high occurrence probability). For instance, in the case of FIG. 9B, firstly, the occurrence probability which corresponds to each of the estimated orientations P_B1 to P_B9 is investigated with reference to the table illustrated in FIG. 9B. As a result, when the occurrence probabilities of the estimated orientations P_B8 and P_B9 are less than the threshold value, for instance, high reliabilities are set to the estimated orientations P_B1 to P_B7, and low reliabilities are set to the estimated orientations P_B8 and P_B9. In this case, the position orientation of a work existing in the lower left part in the image of FIG. 9B results in having not been estimated with high reliability. Thus, the erroneous estimation result is prevented from slipping into the estimation results having the high reliability. This mechanism functions very effectively when there is a plurality of estimation results, and one estimation result that is likely to be the smallest possible erroneous estimation needs to be selected (though the detail of such a system will be described in the second embodiment). In addition, in the second case as well, it is also considered to calculate the reliability in consideration of not only the occurrence probability but also the score obtained when the orientation has been estimated, in the same way as in the above described first case. For instance, such a method is considered as to give high reliability to estimation results having such score values as to be included in a predetermined number of higher order score values, in descending order of the occurrence probability, and give low reliability to the other estimation results. In addition, such a method is considered as to provide a predetermined threshold value for the score values, give high reliability to the estimation results having the score values exceeding the threshold value in a descending order of the occurrence probability, and give low reliability to the other estimation results. Furthermore, the weighted sum of the score value and the occurrence probability may be adopted as the reliability, in the same way as in the above described first case.

In addition, the case is also considered where one or more orientations are output as the estimation results to each of a plurality of positions to be estimated which include positions in the first case and the second case in combination. In such a case, the method may be used which has combined the technique of calculating the reliability in the first case with the technique of calculating the reliability in the second case (though the detail in this case will be described in the second embodiment).

As in the above described way, the reliability calculation unit 110 calculates the reliability, adds the reliability to the orientation estimation result, and outputs the estimation result having the reliability added thereto.

Next, the operation sequence of the image processing apparatus 100-1 according to the present embodiment will be described below.

Firstly, the camera 103 obtains an image in which the works 101 have been captured.

Subsequently, the work state estimation unit 106 estimates the position orientations of the plural works 101. Subsequently, the reliability calculation unit 110 calculates the reliability for the position orientations of the plural works 101, which have been estimated by the work state estimation unit 106.

The estimation results of the position orientations provided with reliability are output from the reliability calculation unit 110.

The above sequence is the operation sequence of the image processing apparatus 100-1 according to the present embodiment.

The image processing apparatus according to the present embodiment calculates the reliability of the position orientations of the works 101 by comparing the occurrence probability to the orientation estimation result. For instance, when the position orientation which has been obtained as the estimation result of the position orientation for a certain work 101 is a position orientation having a low occurrence probability, the image processing apparatus determines that the estimation result of the position orientation for the work 101 is likely to be erroneous estimation, and performs the processing of setting low reliability to the estimation result. Furthermore, the image processing apparatus performs the processing of giving higher reliability to the estimation result having the high occurrence probability as well as the high score, with the use of the score (for instance, correlation value) which has been given when the position orientation of the work 101 has been estimated. This processing results in the orientation estimation result which has been estimated to be an orientation that has been originally estimated to frequently occur (orientation that has high occurrence probability) being more trusted. In other words, the image processing apparatus provides the estimation results having high reliability by calculating the reliability of the orientation in consideration of a knowledge which has been obtained till now (whether the orientation is an orientation which easily occurs or an orientation which rarely occurs), compared to an operation of using the score value obtained when the position orientation of the work 101 has been estimated as the reliability in the state, and enables the erroneous estimation to be prevented from slipping in the estimation results having the high reliability.

Second Embodiment

In the above described first embodiment, an example has been described in which the position orientation of the work has been estimated by using the image processing apparatus according to the embodiment of the present invention. In the second embodiment, a work picking system which has used the estimation result will be described below.

Figure 10:
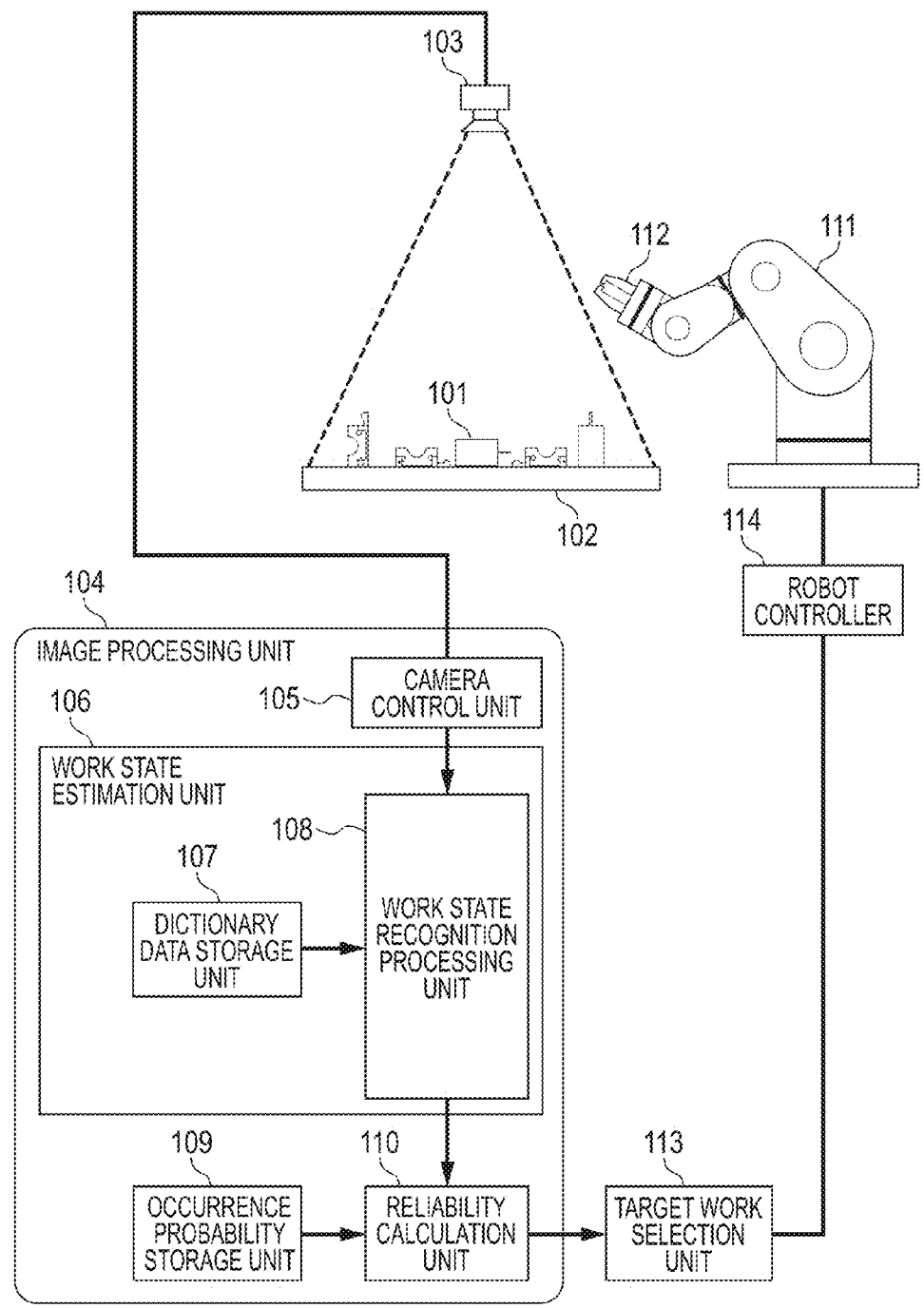
FIG. 10 is a schematic view which illustrates one example of a schematic structure of a work picking system according to a second embodiment of the present invention.

FIG. 10 is a schematic view which illustrates one example of a schematic structure of a work picking system 1000-1 according to a second embodiment of the present invention. In FIG. 10, similar configurations to those illustrated in FIG. 1 are designated by the same reference numerals. Specifically, in FIG. 10, reference numerals 101 to 110 have the same configurations as those in FIG. 1, and accordingly the description will be omitted.

FIG. 10 shows a robot arm 111.

A hand mechanism 112 is an end effector of the robot arm 111.

The robot arm 111 and the hand mechanism 112 constitute a work picking unit which sequentially picks the plural works 101 loaded on the tray 102, based on the control of a robot controller 114.

A target work selection unit 113 is shown. The target work selection unit 113 determines a work (target work) that is picked by the robot arm 111 and the hand mechanism 112 this time based on the information and reliability of the positions and/or orientations of each of the works, which have been estimated by the image processing unit 104. The target work selection unit 113 transmits the position and orientation of the determined target work to the robot controller 114. A technique of selecting the work to be picked shall make the work selected which has high reliability given thereto when the position orientation has been estimated by the image processing unit 104.

The robot controller 114 is shown. The robot controller 114 controls the robot arm 111 and the hand mechanism 112 so as to pick the target work which has been selected by the target work selection unit 113 from among the plural works 101 that are loaded on the tray 102. Here, the robot controller 114 generally includes a computer, but in the present embodiment, the structure is not limited.

Next, a procedure of processing in the work picking system 1000-1 according to the present embodiment will be described below with reference to FIG. 11.

Figure 11:
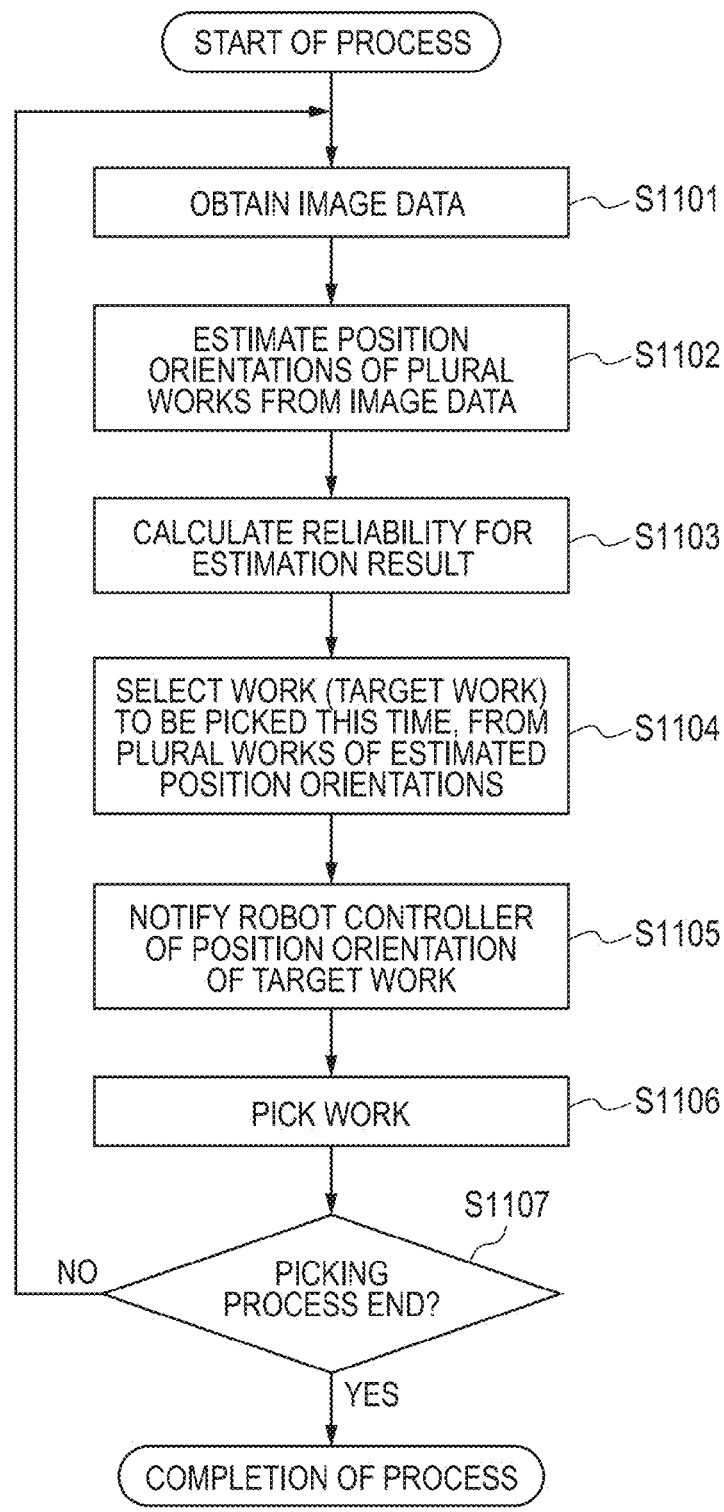
FIG. 11 is a flow chart which illustrates one example of a procedure of processing in the work picking system according to the second embodiment of the present invention.

FIG. 11 is a flow chart which illustrates one example of a procedure of processing in the work picking system 1000-1 according to the second embodiment of the present invention. FIG. 11 will be described below.

Firstly, in a step S1101, the camera 103 photographs the work 101 which is loaded on the tray 102, based on the control of the camera control unit 105, and obtains an image (image data) in which the works 101 have been captured. Then, the image processing unit 104 (camera control unit 105) obtains the image (image data) in which the works 101 have been captured, from the camera 103.

Subsequently, in a step S1102, the work state estimation unit 106 estimates the position orientations of the plural works 101, from the image (image data) which has been obtained in the step S1101.

Subsequently, in a step S1103, the reliability calculation unit 110 calculates the reliability for the estimated position orientation from the information on the estimation result of the position orientation, which is output from the work state estimation unit 106, and the information on the occurrence probability, which is stored in the occurrence probability storage unit 109.

Subsequently, in a step S1104, the target work selection unit 113 selects a work (target work) which is to be picked this time from among plural works of estimated position orientations 101, based on the reliability that has been calculated in the step S1103.

Subsequently, in a step S1105, the target work selection unit 113 notifies the robot controller 114 of the position orientation relating to the target work which has been selected in the step S1104.

Subsequently, in a step S1106, the robot controller 114 controls the robot arm 111 and the hand mechanism 112, and performs the processing of picking the target work from among the plural works 101 loaded on the tray 102.

Subsequently, in a step S1107, the work picking system 1000-1 (for instance, image processing apparatus or robot controller 114) determines whether to end a picking process or not. This determination is performed based on a determination result whether a predetermined number of works have been picked or not, or the like.

When the picking process has not been ended and the picking process is continued, as a result of the determination in the step S1107, the procedure shifts to the processing of the step S1101.

On the other hand, when the picking process is ended as a result of the determination in the step S1107, processing in the flow chart illustrated in FIG. 11 is ended.

Incidentally, the reliability in the step S1103 in FIG. 11 may be calculated as has been described in the first embodiment, but here, an operation of a more general case will be described below where one or more orientations are output for each of a plurality of the estimated positions as the estimation results from the work state estimation unit 106.

Figure 12:
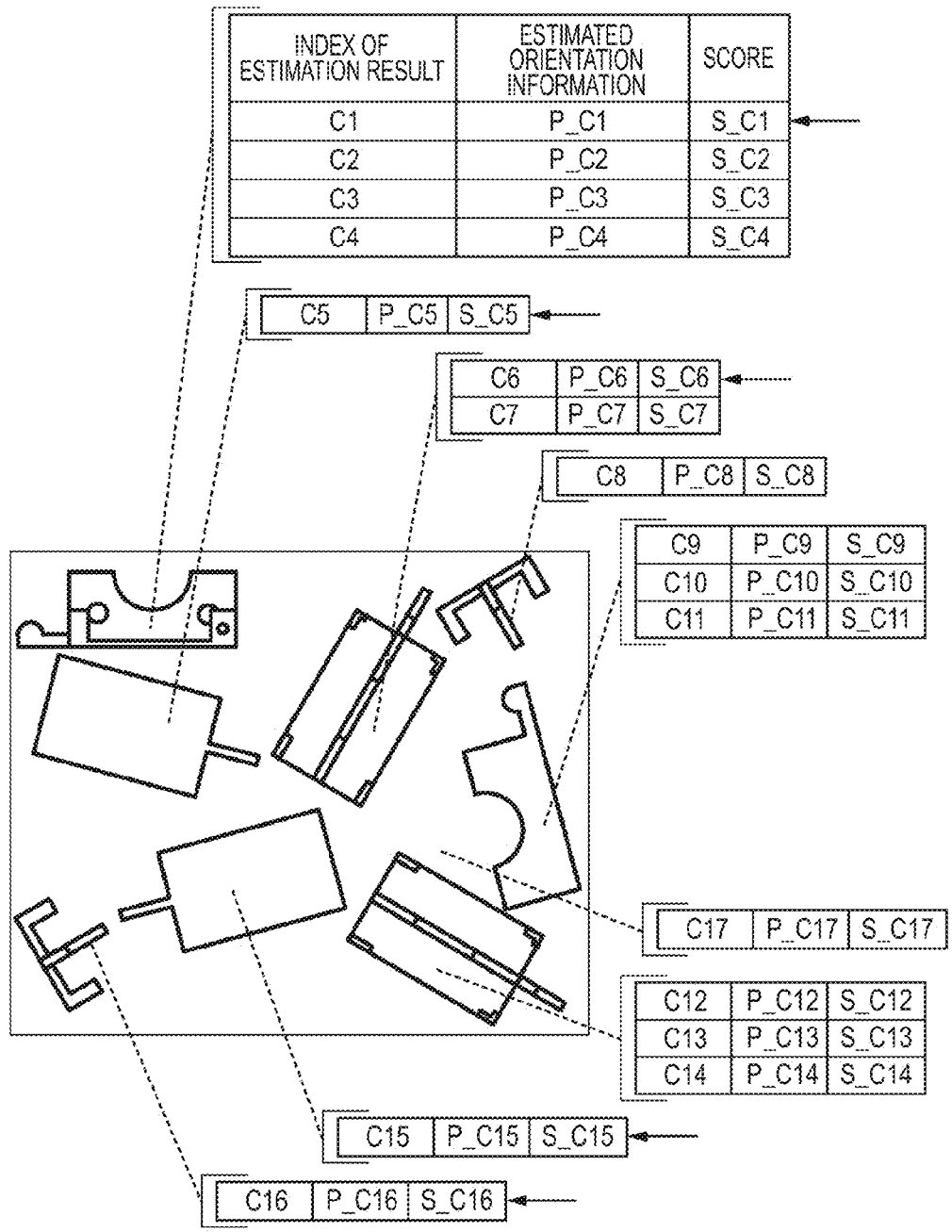
FIG. 12 is a schematic view which illustrates the second embodiment of the present invention and illustrates one example of the estimation result by a work state estimation unit in FIG. 10.

FIG. 12 is a schematic view which illustrates the second embodiment of the present invention and illustrates one example of the estimation result by a work state estimation unit 106 in FIG. 10.

FIG. 12 illustrates the case where one or more orientations are estimated for each of 9 positions in the image. (FIG. 12 illustrates an example in which the estimation result C17 is a result of a place where there is no work, but erroneous estimation occurs because of a noise or the like.) In the present embodiment, the position orientation of the work is estimated for the work picking system 1000-1, and accordingly it is important that the target work selection unit 113 selects the work of which the estimated position orientation is not erroneous, in a step S1104 in FIG. 11. Because the target work selection unit 113 selects the target work based on the reliability, it becomes important to give high reliability to the work of which the estimated position orientation is not erroneous, in the reliability calculation unit 110. In this case, such a method is considered as to provide a predetermined threshold value for the score values, give high reliability to the estimation results having the score values exceeding the threshold value in a descending order of the occurrence probability, and give low reliability to the other estimation results in the reliability calculation unit 110. In FIG. 12, for instance, 17 types (C1 to C17) of the position orientations in total are estimated, and threshold processing is performed with respect to the score values (S_C1 to S_C17) of the 17 types. At this time, suppose that the score values of the estimation results of C1, C5, C6, C15 and C16 have exceeded the threshold value (shown by arrow in the figure). Then, the reliability calculation unit 110 investigates the occurrence probabilities thereof, and gives high reliability to the estimation results in a descending order of the occurrence probability.

In this case, the magnitude relation of the score value and the magnitude relation of the reliability are occasionally reverse to each other. This is based on the following way of thinking.

Firstly, it is considered that an estimation result having a large score value to some extent (estimation result of which the score value has passed threshold processing) is considerably reliable. However, because the estimation is performed for the work picking system 1000-1, the reliability calculation unit is desired to select the estimation result which is particularly surely not erroneous estimation, among the estimation results each having a large score value to some extent. In this case, it is sure to select an estimation result of the orientation which has been estimated to be an orientation that has been originally estimated to be likely to frequently occur (orientation having high occurrence probability). In other words, the above way is such a way of thinking that erroneous estimation is likely to be less probable when the estimation result having both a higher score value and a higher occurrence probability (than predetermined threshold value) is selected rather than the estimation result having a higher score value (than predetermined threshold value) but a lower occurrence probability (than predetermined threshold value).

Third Embodiment

In the above described first and second embodiments, the work 101 is loaded in an irregular state on the tray 102, and such a case has been supposed that the works do not overlap each other. In the third embodiment, such a case will be described that position orientations are estimated for the works of so-called being loaded in bulk in which the works overlap each other (in the state in which plural works are untidily placed in piled state). Incidentally, in the following description for the third embodiment, the points will be mainly described which are different from those in the first and second embodiments.

In the third embodiment, a method of calculating the occurrence probability which is stored in an occurrence probability storage unit is different from that in the case of the first embodiment. In the present embodiment, it is supposed that the works 101 overlap each other, and accordingly the step S708 is omitted in the procedure of processing in FIG. 7. Specifically, in the step S707 in FIG. 7, it is determined whether the number of trials has reached a predetermined number of times or not. When the number of the trials has not reached the predetermined number, the procedure shifts to the processing of the step S702, and the trial is repeated. At this time, the work 101 which has been previously dropped onto the tray 102 in the step S703 is not removed. When the number of the trials has reached the predetermined number of times as a result of the determination in the step S707 in FIG. 7, the processing advances to the step S709. Then, the image processing unit 104, for instance, normalizes the obtained orientation histogram (divides frequency value in each bin by number of trials) to obtain the occurrence probability. Due to this procedure of processing, the works 101 result in being gradually loaded in bulk, and accordingly the occurrence probabilities of the works in a state of being loaded in bulk can be calculated. By using thus obtained occurrence probability, reliability in the present invention can also be calculated for the works 101 in a state of being loaded in bulk.

In addition, it is also acceptable to use a method of calculating the occurrence probability for each number of works loaded in bulk (number of works 101 which constitute bulk). This method is the processing of supposing the maximum number of the works 101 which constitute the bulk, and calculating the occurrence probability for each of the works in the states of being loaded in bulk, which include the works 101 of the maximum number or less. For instance, when it is supposed that the maximum number of the number of the works 101 which constitute the bulk is 30 pieces, the method calculates the occurrence probability for the bulk which includes one work, the occurrence probability for the bulk which includes two works, . . . and the occurrence probability for the bulk which includes 30 works, respectively. In other words, 30 types of occurrence probabilities are calculated.

The work picking system as described above which uses the occurrence probability that is calculated for each number of works loaded in bulk will be described below with reference to FIG. 13.

Figure 13:
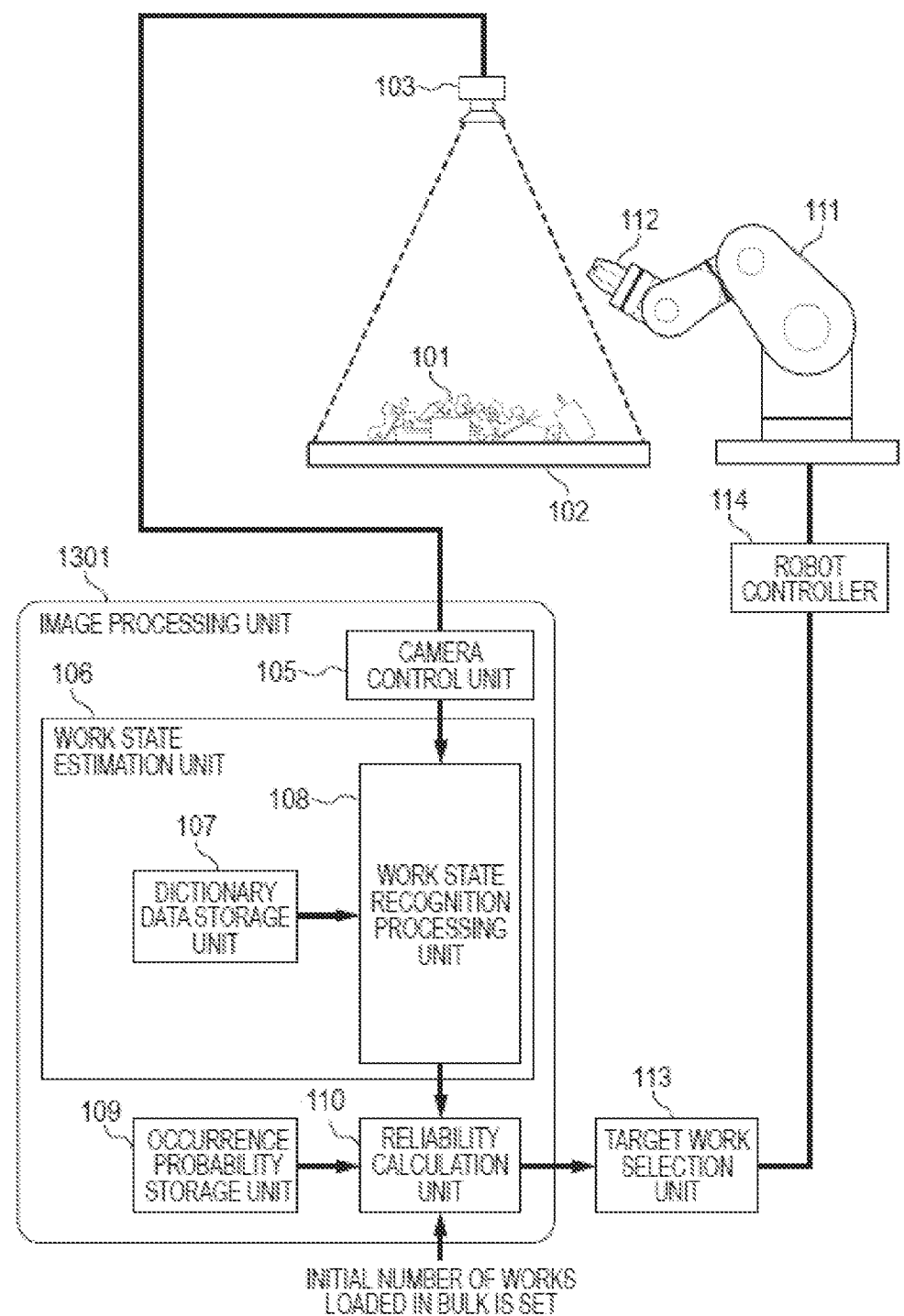
FIG. 13 is a schematic view which illustrates one example of a schematic structure of a work picking system according to a third embodiment of the present invention.

FIG. 13 is a schematic view which illustrates one example of a schematic structure of a work picking system 1000-2 according to the third embodiment of the present invention. In FIG. 13, similar configurations to those illustrated in FIG. 10 are designated by the same reference numerals. Specifically, in FIG. 13, reference numerals 101 to 103, 105 to 108 and 111 to 114 have the same configurations as those in FIG. 10, and accordingly the description will be omitted.

FIG. 13 shows an image processing unit 1301. As illustrated in FIG. 13, the image processing unit 1301 includes the camera control unit 105, the work state estimation unit 106, an occurrence probability storage unit 109 and a reliability calculation unit 110.

The occurrence probability storage unit 109 is shown, which is different from the occurrence probability storage unit 109 in the work picking system 1000-1 according to the second embodiment, only in the number of the occurrence probabilities that are stored in the unit. Specifically, the occurrence probability storage unit 109 (FIG. 1 and FIG. 10) in the first and second embodiments has been a unit which stores one occurrence probability therein, but the occurrence probability storage unit 109 according to the present embodiment shall store the occurrence probabilities of the maximum number of the works 101 therein (for instance, 30 pieces) which constitute the bulk.

The reliability calculation unit 110 is shown. An initial number of works loaded in bulk, which shows how many works are loaded in bulk on the tray 102 is set in the reliability calculation unit 110, when a work picking operation starts. The reliability calculation unit 110 calculates reliability by using the occurrence probability which corresponds to the number of the works that constitute the present bulk when calculating the reliability. For instance, when the initial number of works loaded in bulk is 30 pieces, the reliability calculation unit 110 calculates the reliability by using the occurrence probability for the bulk which includes 30 pieces of works, in the first calculation processing for the reliability. In the following calculation processing for the reliability, the reliability calculation unit 110 calculates the reliability by using the occurrence probability for the bulk which includes 29 pieces of works, because one piece has been picked from 30 pieces in the bulk. Thus, the reliability calculation unit 110 calculates the reliability.

In addition, it is also acceptable to provide a mechanism which determines the success/unsuccess of picking in the robot controller 114 though the mechanism is not illustrated in FIG. 13, and calculate the present number of the works loaded in bulk by feeding back the information to the reliability calculation unit 110.

In the work picking system 1000-2 illustrated in FIG. 13, it is enabled to use the occurrence probability which corresponds to a state of works loaded in bulk, and the reliability can be calculated more reliably. Specifically, when an operation of picking the works 101 advances and the number of the works 101 on the tray 102 becomes small, it is anticipated that the works 101 overlap each other also with a low frequency and that the occurrence probability becomes close to the occurrence probability which has been calculated in the first and second embodiments. On the contrary, right after the operation of picking the works has started, the works 101 are in a state of being loaded in bulk and overlap each other with a high frequency. Accordingly, it is anticipated that the occurrence probability is much different from the occurrence probability which has been calculated in the first and second embodiments. Thus, it is fully considered that the state of the occurrence probability changes according to a state of the works loaded in bulk, and accordingly it is considered effective to use the occurrence probability which corresponds to the state of the works loaded in bulk.

A procedure of calculation processing for the occurrence probability in the present embodiment will be described below with reference to FIG. 14.

Figure 14:
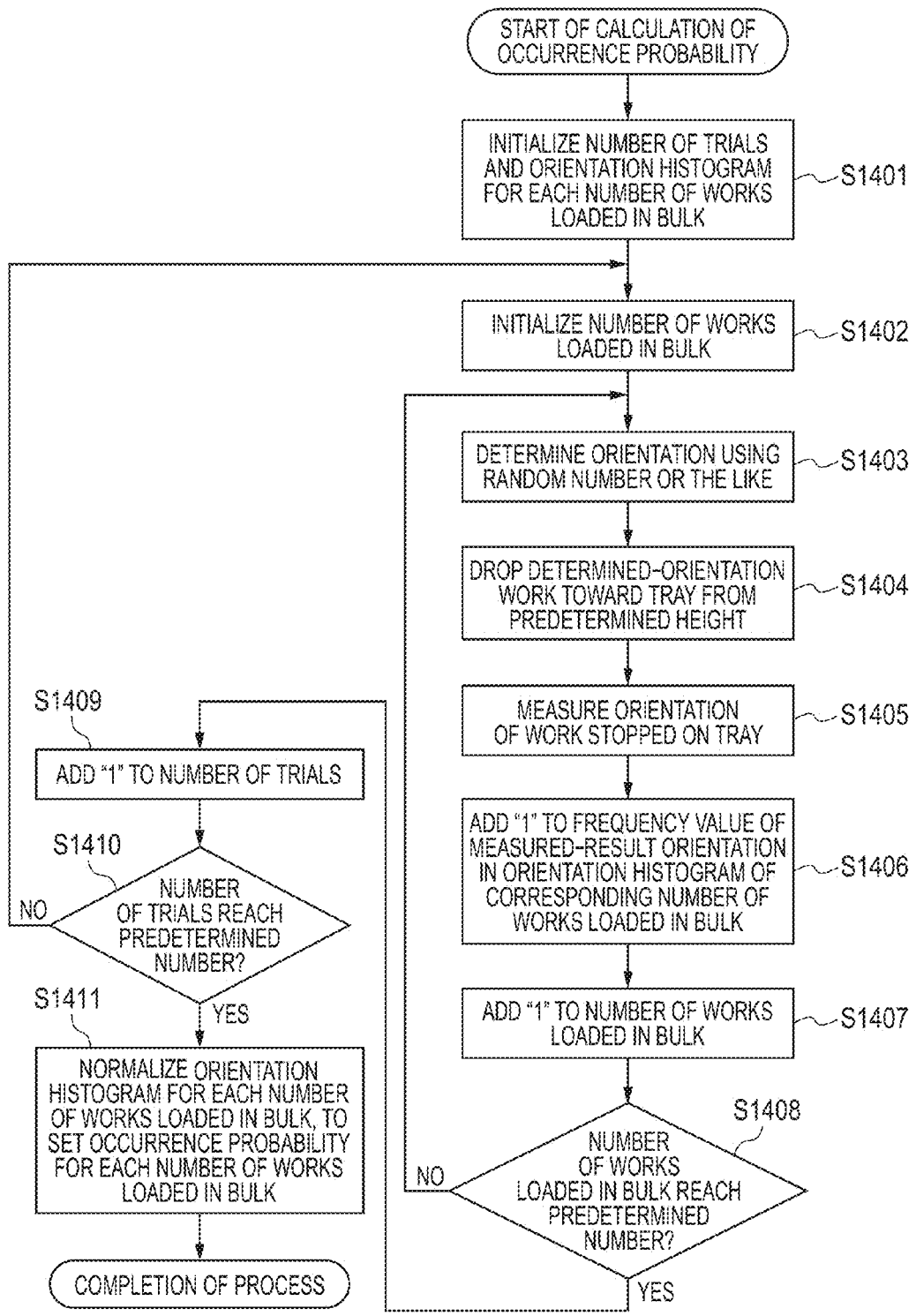
FIG. 14 is a flow chart which illustrates the third embodiment of the present invention and illustrates one example of a procedure of calculation processing for the occurrence probability.

FIG. 14 is a flow chart which illustrates the third embodiment of the present invention and illustrates one example of the procedure of calculation processing for the occurrence probability. FIG. 14 will be described below.

Firstly, in a step S1401, an image processing unit 1301, for instance, initializes the number of trials to "0", and simultaneously initializes the value of each bin in the orientation histogram to "0", which is prepared for each number of the works loaded in bulk.

Subsequently, in a step S1402, the image processing unit 1301, for instance, initializes a counter value which shows the number of the works loaded in bulk, to "0".

Subsequently, in a step S1403, the image processing unit 1301, for instance, randomly selects (determines) the orientation by using the random number.

Subsequently, in a step S1404, the work 101 which has the orientation that has been selected in the step S1403 is dropped toward the tray 102 from a predetermined height.

When the movement of the work 101 which has been dropped onto the tray 102 has stopped, subsequently in a step S1405, the orientation of the work 101 is measured. This orientation may be visually measured by a human. Alternatively, a measurement method may be adopted which uses the work state recognition processing unit 108 that has been described in the first embodiment, and determines, for instance, an orientation of which the score has been estimated to be highest as the orientation.

After the measurement of the orientation has ended, subsequently in a step S1406, the image processing unit 1301, for instance, performs the processing of adding "1" to a frequency value in the bin which is set for the orientation of the measurement result, which is considered to be a bin in the orientation histogram that corresponds to a counter value which shows the present number of the works loaded in bulk.

Subsequently, in a step S1407, the image processing unit 1301, for instance, performs the processing of adding "1" to the counter value which shows the number of the works loaded in bulk.

Subsequently, in a step S1408, the image processing unit 1301, for instance, determines whether the counter value which shows the number of the works loaded in bulk has reached a predetermined value or not.

When the counter value which shows the number of the works loaded in bulk has not reached the predetermined value as a result of the determination in the step S1408, the procedure shifts to the processing of the step S1403, and the processing is repeated.

On the other hand, when the counter value which shows the number of the works loaded in bulk has reached the predetermined value as a result of the determination in the step S1408, the processing advances to a step S1409.

When the processing advances to the step S1409, the image processing unit 1301, for instance, performs the processing of adding "1" to the number of trials.

Subsequently, in a step S1410, the image processing unit 1301, for instance, determines whether the number of the trials has reached a predetermined number of times or not.

When the number of trials has not reached the predetermined number of times as a result of the determination in the step S1410, the procedure shifts to the processing of the step S1402, and the processing is repeated.

On the other hand, when the number of trials has reached the predetermined number of times as a result of the determination in the step S1410, the processing advances to a step S1411.

When the processing advances to the step S1411, the image processing unit 1301, for instance, normalizes each of the obtained orientation histograms (divides frequency value in each bin by number of trials) to obtain the occurrence probability.

The occurrence probability which has been obtained according to the above described procedure of processing in the steps S1401 to S1411 in FIG. 14 is stored in the occurrence probability storage unit 1302 beforehand.

Fourth Embodiment

In the above described first to third embodiments, the method illustrated in FIG. 7 or FIG. 14 has been shown as a technique of calculating the occurrence probability to be stored in the occurrence probability storage unit (109 in FIG. 1 and FIG. 10, and 109 in FIG. 13), but the technique of calculating the occurrence probability to be used in the present invention is not limited to this technique. A technique of calculating the occurrence probability by using a simulation may be employed as will be shown in the present embodiment. In other words, in the first to third embodiments, the occurrence probability has been calculated by the repetition of actual trials, but the present embodiment shows an example of the case where the occurrence probability is calculated by the simulation of virtually performing trials with the use of a three-dimensional geometric model of the work 101.

The procedure of calculation processing for the occurrence probability only differs in an actual trial or a virtual trial, and accordingly the occurrence probability can be calculated according to the same procedure of processing as that in FIG. 7 or FIG. 14. However, in the present embodiment, the work 101 is dropped in the simulation, and accordingly the movement of the work 101 after having been dropped and even the position orientation of the work 101 which has stopped the movement after that become clear on the simulation. Accordingly, there is an advantage that the trial in the simulation can calculate the occurrence probability more efficiently than the trial using the actual work 101.

Fifth Embodiment

In the above described first to fourth embodiments, such a technique has been employed as to calculate the occurrence probability to be stored in the occurrence probability storage unit (109 in FIG. 1 and FIG. 10, and 109 in FIG. 13) beforehand, but a technique of calculating the occurrence probability to be used in the present invention is not limited to the above technique. The technique may include updating the occurrence probability whenever the position orientation of the work 101 has been recognized, as will be shown in the present embodiment.

Figure 15:
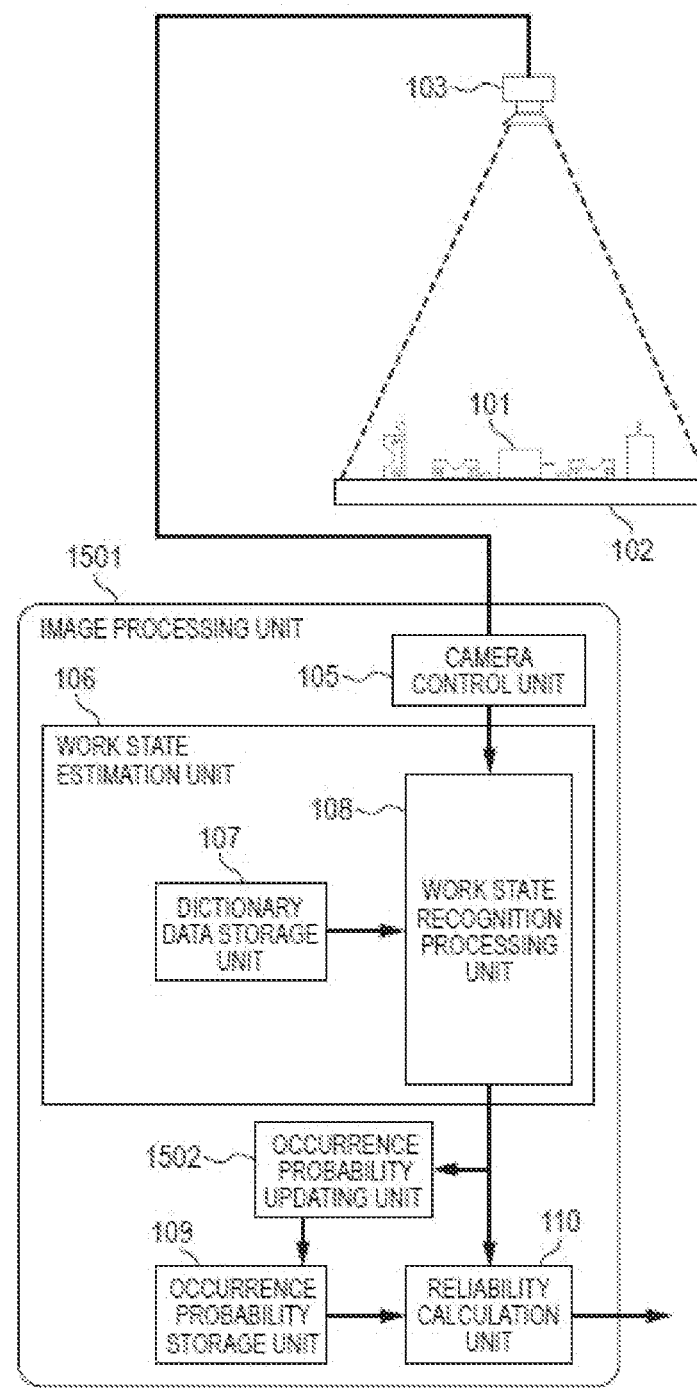
FIG. 15 is a schematic view which illustrates one example of a schematic structure of an image processing apparatus according to a fifth embodiment of the present invention.

In the present embodiment, an example of the technique will be shown with reference to FIG. 15, which includes a procedure of updating the occurrence probability in the image processing apparatus 100-1 (FIG. 1) illustrated in the first embodiment.

FIG. 15 is a schematic view which illustrates one example of a schematic structure of an image processing apparatus 100-2 according to a fifth embodiment of the present invention. In FIG. 15, similar configurations to those illustrated in FIG. 1 are designated by the same reference numerals. Specifically, in FIG. 15, reference numerals 101 to 103, 105 to 108 and 110 have the same configurations as those in FIG. 1, and accordingly the description will be omitted.

FIG. 15 shows an image processing unit 1501. As illustrated in FIG. 15, the image processing unit 1501 includes the camera control unit 105, the work state estimation unit 106, an occurrence probability updating unit 1502 and an occurrence probability storage unit 109 and the reliability calculation unit 110.

The occurrence probability updating unit 1502 is shown. Whenever the work state estimation unit 106 estimates the position orientation of the work 101, the occurrence probability updating unit 1502 receives the estimation results, updates the occurrence probability and sets the updated occurrence probability in the occurrence probability storage unit 109.

The occurrence probability storage unit 109 is shown. The occurrence probability storage unit (109 in FIG. 1 and FIG. 10, and 109 in FIG. 13) illustrated in the first to fourth embodiments has been a unit which stores the previously calculated occurrence probability therein, but the occurrence probability storage unit 109 in the present embodiment is configured so as to be capable of setting the occurrence probability to be sent from the occurrence probability updating unit 1502 at any time.

Next, a procedure of update processing for the occurrence probability by the occurrence probability storage unit 109 and the occurrence probability updating unit 1502 will be described.

First, in the initial state (before recognition processing for the position orientation of the work 101 starts), the previously calculated occurrence probability (which is referred to as "initial occurrence probability") is stored in the occurrence probability storage unit 109 as in the previous embodiments. Similarly, in the initial state, an orientation histogram (table of frequency value for every orientation) which is formed when the initial occurrence probability has been calculated and the number of trials at this time are stored in the occurrence probability updating unit 1502.

Subsequently, when the estimation processing for the position orientation of the work 101 starts in the work state estimation unit 106, the work state estimation unit 106 transmits the estimated estimation result to the occurrence probability updating unit 1502. The occurrence probability updating unit 1502 receives the estimation result, and performs the processing of adding "1" to the frequency value in the bin which is set for the orientation, and adding "1" also to the number of trials. The occurrence probability updating unit 1502 further obtains a new occurrence probability by normalizing the obtained orientation histogram (dividing frequency value in each bin by number of trials), and sets the occurrence probability in the occurrence probability storage unit 109. In this case, even though the estimation result estimated by the work state estimation unit 106 has shown the correct position orientation, or has shown an erroneous position orientation, the occurrence probability results in being updated. Accordingly, if it could be determined whether the estimation result was correct or erroneous by some units (for instance, by visual check of human), the occurrence probability may be updated only when the correct position orientation has been estimated. After this, whenever the work state estimation unit 106 estimates the position orientation of the work 101, the occurrence probability updating unit repeats the above described processing, and updates the occurrence probability.

Thus, the occurrence probability updating unit 1502 updates the occurrence probability while estimating the position orientation of the work 101, and thereby the image processing unit 1501 can bring the occurrence probability close to the one which reflects the actual environment (the state of works 101 loaded in bulk or the like), and can calculate the reliability which approximates to the real environment more exactly. This method is effective when the environment in which the initial occurrence probability is calculated is different from the environment in which the position orientation of the work 101 is actually estimated. The method is effective, for instance, when the size and shape of the tray 102 are different between the environment when the initial occurrence probability has been calculated and an actual environment, or when the state of works loaded in bulk changes due to the difference between methods with which the works 101 are supplied to the tray 102.

Furthermore, the occurrence probability can be updated in a form of having added weight thereto when updating the occurrence probability, as in the present embodiment. For instance, in the above described example, such processing is performed as to add "1" to each of the frequency value and the number of trials whenever the work state estimation unit 106 estimates the position orientation of the work 101, but the occurrence probability can be updated in a form of having added the weight thereto by changing the adding value. For instance, if "2" has been added to each of the frequency value and the number of trials, the occurrence probability can be more quickly brought close to that which reflects the actual environment.

In addition, the calculation of the initial occurrence probability can also be omitted, which should have been originally performed beforehand, by using the updating function for the occurrence probability in the present embodiment. In this case, while the position orientation of the work 101 is estimated under the actual environment, the occurrence probability shall be calculated with the use of the estimation result. Therefore, it is supposed that reliable occurrence probabilities are not calculated when the position orientations of the first several pieces of works 101 have been estimated, but during that time, an equal occurrence probability may be set to every orientation.

Other Embodiments

In the embodiments which have been described till now, the cases have been mainly described where the occurrence probability concerning the orientation of the work 101 is used. However, the occurrence probability to be used in the present invention is not limited to the occurrence probability concerning the orientation of the work 101. The occurrence probability, for instance, concerning the position of the work 101 may be used. Furthermore, the occurrence probability which depends on both of the position and the orientation may be used.

For instance, when the works 101 are arranged in the vicinity of the center of the tray 102 in many cases, and are not often arranged around the end, the works exist in the vicinity of the center of the photographed image in many cases, and accordingly it is effective to calculate the reliability by using the occurrence probability concerning the position. In addition, when the works are loaded in bulk, and when there is a difference between the orientation which easily occurs in the vicinity of the center of the bulk and the orientation which easily occurs at the end of the bulk, the frequency of occurrence of the orientation changes according to the position in the photographed image. Accordingly, it is effective to calculate the reliability by using the occurrence probability concerning the position and the orientation.

In addition, in the embodiments which have been described till now, the cases have been shown where the positions of the works 101 to be estimated by the work state recognition processing unit 108 are two-dimensional, but the object in the present invention is not limited to the two-dimensional position. For instance, a three-dimensional position of the works 101 may be estimated. In this case, such an occurrence probability can be used as to depend also on a depth direction of the position. In addition, if being necessary in this case, such a camera will be used as to be capable of obtaining also distance information, as the camera 103.

In addition, in the embodiments which have been described till now, the case of correlation processing using a template prepared for every orientation has been shown as a technique of estimating the position orientation in the work state recognition processing unit 108, but the object in the present invention is not limited to the above case. For instance, such a technique may be used as to estimate the position and the orientation by performing the orientation estimating technique using a decision tree while displacing the position in the image.

In addition, the speed of image processing for estimating the position orientation in the work state recognition processing unit 108 can increase by deleting a template that corresponds to the orientation which has been determined to have a smaller probability than the predetermined probability when the occurrence probability has been calculated, from dictionary data. Furthermore, the speed of image processing for estimating the position orientation in the work state recognition processing unit 108 can increase by excluding a position which has been determined to have a smaller probability than the predetermined probability (predetermined threshold), from the object to be scanned.

In addition, in the embodiments which have been described till now, the image processing unit (104 in FIG. 1 and FIG. 10, 1301 in FIG. 13, and 1501 in FIG. 15) is generally structured from a computer, but the present invention is not limited to the structure. In addition, the image processing unit may be integrated with the robot controller 114.

In addition, the present invention is also achieved by performing the following processing.

Specifically, the processing is the one in which software (program) that achieve the function of the above described embodiment is supplied to a system or an apparatus through a network or various storage media, and a computer (or CPU, MPU or the like) of the system or the apparatus reads and executes the program. This program and a computer readable recording medium (storage medium) which has stored the program therein are included in the present invention.

In addition, the above described embodiments of the present invention have merely shown examples of the embodiments for carrying out the present invention, and the technical scope of the present invention must not be restrictively interpreted by the examples. In other words, the present invention can be carried out in various forms, in the extent which does not deviate from the technical idea or the main feature.

The present invention can provide a structure which reduces the erroneous estimation when the state of the work is estimated.

Specifically, the present invention enables the erroneous estimation for the state of the work to be reduced by calculating the occurrence probability which corresponds to each state (each position orientation or the like) of the work beforehand and using the occurrence probability. More specifically, the method for calculating the reliability for the estimated state of the work in the present invention includes: calculating the occurrence probability which statistically shows how often the state tends to be generated for each state of the work beforehand; storing the occurrence probabilities which have been associated with each state of the work; then photographing the works which have been placed in a predetermined state; estimating the state of the work from the photographed image; and checking the state of the work obtained as a result of the estimation with the previously stored occurrence probability. When the state of the work obtained as a result of the estimation shows a low occurrence probability, for instance, there is a high possibility that the estimation for the state of the work is erroneous estimation, and accordingly the reliability for the estimation becomes low.

The embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access storage (RAM), a read only storage (ROM), a storage of distributed computing systems, an optical disk (such as a compact disc (CD), digital versatile disc (DVD), or Blue-ray Disc (BD)™), a flash storage device, a storage card, and the like.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-132248, filed Jun. 11, 2012, which is hereby incorporated by reference herein in its entirety.

What is claimed is:

1. An image processing apparatus comprising:
   an image input unit configured to input an image of a plurality of objects;
   an orientation estimation unit configured to estimate each of a plurality of orientations of a plurality of picking target objects included in the plurality of objects based on the image;
   an occurrence likelihood storage unit configured to store an occurrence likelihood corresponding to each of the orientations that the objects can have;
   an occurrence likelihood obtaining unit configured to obtain each occurrence likelihood for each of the plurality of orientations of the plurality of picking target objects by referring to the occurrence likelihood storage unit, wherein each occurrence likelihood represents a likelihood of occurrence of each of the plurality of orientations;

a reliability obtaining unit configured to obtain a reliability for each estimated orientation of the plurality of picking target objects, based on the obtained occurrence likelihood, wherein the obtained reliability increases as the obtained occurrence likelihood increases;

a comparison unit configured to compare the obtained reliabilities of the plurality of picking target objects; and a selection unit configured to select an object, among the plurality of picking target objects, to be picked by a picking unit, based on the comparison of the obtained reliabilities of the plurality of picking target objects, wherein the image input unit, the orientation estimation unit, the occurrence likelihood obtaining unit, the reliability obtaining unit, comparison unit, and the selection unit are implemented by a processor and a memory.

2. An image processing apparatus comprising:

an image input unit configured to input an image of a plurality of objects;

an orientation estimation unit configured to estimate each of a plurality of orientations of a plurality of picking target objects included in the plurality of objects based on the image;

an occurrence likelihood storage unit configured to store an occurrence likelihood corresponding to each of the orientations that the objects can have, wherein the occurrence likelihood is obtained based on a result by recording an estimated orientation of the picking target object, which has been estimated by the orientation estimation unit;

an occurrence likelihood obtaining unit configured to obtain each occurrence likelihood for each of the plurality of orientations of the plurality of picking target objects by referring to the occurrence likelihood storage unit, wherein each occurrence likelihood represents a likelihood of occurrence of each of the plurality of orientations;

a reliability obtaining unit configured to obtain a reliability for each estimated orientation of the plurality of picking target objects, based on the obtained occurrence likelihood, wherein the obtained reliability increases as the obtained occurrence likelihood increases;

a comparison unit configured to compare the obtained reliabilities of the plurality of picking target objects; and a selection unit configured to select an object, among the plurality of picking target objects, to be picked by a picking unit, based on the comparison of the obtained reliabilities of the plurality of picking target objects, wherein the image input unit, the orientation estimation unit, the occurrence likelihood obtaining unit, the reliability obtaining unit, comparison unit, and the selection unit are implemented by a processor and a memory.

3. The image processing apparatus according to claim 1, wherein the occurrence likelihood which is stored in the occurrence likelihood storage unit is updated based on a result of estimation by the orientation estimation unit for the orientation of the picking target object.

4. The image processing apparatus according to claim 1, wherein the orientation estimation unit treats an estimated orientation as erroneous, in a case when the picking target object is in an orientation of having the occurrence likelihood smaller than a predetermined threshold value.

5. The image processing apparatus according to claim 1, wherein the orientation estimation unit estimates an orientation of the picking target object and also calculates a score for an estimation result, and the reliability obtaining unit obtains the reliability while considering the score.

6. A picking system comprising:

an image processing apparatus including:

an image input unit configured to input an image of a plurality of objects;

an orientation estimation unit configured to estimate each of a plurality of orientations of a plurality of picking target objects included in the plurality of objects based on the image;

a storage unit configured to store an occurrence likelihood corresponding to each of the orientations that the objects can have, wherein the occurrence likelihood is obtained based on a result by repeating a simulation of virtually arranging a three-dimensional geometric model of the object;

an occurrence likelihood obtaining unit configured to obtain each occurrence likelihood for each of the plurality of orientations of the plurality of picking target objects by referring to the storage unit, wherein each occurrence likelihood represents a likelihood of occurrence of each of the plurality of orientations;

a reliability obtaining unit configured to obtain reliability for each estimated orientation of the plurality of picking target objects, based on the obtained occurrence likelihood, wherein the obtained reliability increases as the obtained occurrence likelihood increases;

a comparison unit configured to compare the obtained reliabilities of the plurality of picking target objects; and a selection unit configured to select an object, among the plurality of picking target objects, based on the comparison of the obtained reliabilities of the plurality of picking target objects; and a picking unit configured to pick the selected object, wherein the image input unit, the orientation estimation unit, the occurrence likelihood obtaining unit, the reliability obtaining unit, the selection unit, comparison unit, and the picking unit are implemented by a processor and a memory.

7. The picking system according to claim 6, wherein the orientation estimation unit estimates an orientation of the picking target object and also calculates a score for an estimation result, and the selection unit selects an object in such an orientation that the score is higher than a predetermined threshold value and also the occurrence likelihood is higher than a predetermined threshold value, as an object to be picked by the picking unit.

8. The picking system according to claim 7, wherein the selection unit is configured to select an object in such an orientation that the score is higher than a predetermined threshold value and also the occurrence likelihood is highest, as an object to be picked by the picking unit.

9. An image processing method for an image processing apparatus that comprises an occurrence likelihood obtaining unit configured to obtain each occurrence likelihood for each of a plurality of orientations, wherein each occurrence likelihood represents a likelihood of occurrence of each of the plurality of orientations, and wherein the occurrence likelihood obtaining unit is implemented by a processor and memory, the method comprising:

inputting an image of a plurality of objects;

estimating each of the plurality of orientations of a plurality of picking target objects included in the plurality of objects based on the image;

storing an occurrence likelihood corresponding to each of the orientations that the objects can have, wherein the occurrence likelihood is obtained based on a result by repeating a simulation of virtually arranging a three-dimensional geometric model of the object;

obtaining each occurrence likelihood for each of the plurality of orientations of the plurality of picking target objects by referring to each stored occurrence likelihood;

obtaining reliability for each estimated orientation the plurality of picking target objects, based on the obtained occurrence likelihood, wherein the obtained reliability increases as the obtained occurrence likelihood increases;

comparing the obtained reliabilities of the plurality of picking target objects; and selecting an object to be picked, among the plurality of picking target objects, based on the comparison of the obtained reliabilities of the plurality of picking target objects.

10. A picking method for a picking system that comprises an occurrence likelihood obtaining unit configured to obtain each occurrence likelihood for each of a plurality of orientations, wherein each occurrence likelihood represents a likelihood of occurrence of each of the plurality of orientations, and a picking unit configured to pick an object one at a time, wherein the occurrence likelihood obtaining unit is implemented by a processor and memory, the method comprising:

inputting an image of a plurality of objects;

estimating each of the plurality of orientations of a plurality of picking target objects included in the plurality of objects based on the image;

storing an occurrence likelihood corresponding to each of the orientations that the objects can have, wherein the occurrence likelihood is obtained based on a result by repeating a simulation of virtually arranging a three-dimensional geometric model of the object;

obtaining each occurrence likelihood for each of the plurality of orientations of the plurality of picking target objects by referring to each stored occurrence likelihood;

obtaining reliability for each estimated orientation of the plurality of picking target objects, based on the obtained occurrence likelihood, wherein the obtained reliability increases as the obtained occurrence likelihood increases;

comparing the obtained reliabilities of the plurality of picking target objects; and selecting an object, among the plurality of picking target objects, to be picked by the picking unit, based on the comparison of the obtained reliabilities of the plurality of picking target objects.

11. The image processing apparatus according to claim 1, wherein the reliability obtaining unit obtains the reliability such that the reliability increases in proportion to the orientation of the higher occurrence likelihood obtained.

12. The image processing apparatus according to claim 1, wherein the selection unit selects the picking target object having the orientation of the highest reliability.

13. The image processing apparatus according to claim 2, wherein the occurrence likelihood which is stored in the occurrence likelihood storage unit is updated based on a result of estimation by the orientation estimation unit for the orientation of a picking target object.

14. The image processing apparatus according to claim 2, wherein the orientation estimation unit treats an estimated orientation of a picking target object as erroneous, in a case when the picking target object is in an orientation for which the occurrence likelihood is smaller than a predetermined threshold value.

15. The image processing apparatus according to claim 2, wherein the orientation estimation unit estimates an orientation of a picking target object and calculates a score for an estimation result, and the reliability obtaining unit obtains the reliability while considering the score.

16. The image processing apparatus according to claim 2, wherein the reliability obtaining unit obtains the reliability such that the reliability increases in proportion to the orientation of the higher occurrence likelihood obtained.

17. The image processing apparatus according to claim 2, wherein the selection unit selects a picking target object having the orientation of the highest reliability.

18. A picking method for a picking system comprising:

inputting an image of a plurality of objects;

estimating each of a plurality of orientations of a plurality of picking target objects included in the plurality of objects based on the image;

storing an occurrence likelihood corresponding to each of the orientations that the objects can have, wherein the occurrence likelihood is obtained based on a result by recording an estimated orientation of the picking target object, which has been estimated;

obtaining each occurrence likelihood for each of the plurality of orientations of the plurality of picking target objects by referring to each stored occurrence likelihood, wherein each occurrence likelihood represents a likelihood of occurrence of each of the plurality of orientations;

obtaining a reliability for each estimated orientation of the plurality of picking target objects, based on the obtained occurrence likelihood, wherein the obtained reliability increases as the obtained occurrence likelihood increases;

comparing the obtained reliabilities of the plurality of picking target objects; and selecting an object, among the plurality of picking target objects, to be picked, based on the comparison of the obtained reliabilities of the plurality of picking target objects.

19. A non-transitory computer-readable medium having instructions stored thereon, which when executed by a processor, cause the processor to:

input an image of a plurality of objects;

estimate each of a plurality of orientations of a plurality of picking target objects included in the plurality of objects based on the image;

store an occurrence likelihood corresponding to each of the orientations that the objects can have, wherein the occurrence likelihood is obtained based on a result by recording an estimated orientation of the picking target object, which has been estimated;

obtain each occurrence likelihood for each of the plurality of orientations of the plurality of picking target objects by referring to each stored occurrence likelihood, wherein each occurrence likelihood represents a likelihood of occurrence of each of the plurality of orientations;

obtain a reliability for each estimated orientation of the plurality of picking target objects, based on the obtained occurrence likelihood, wherein the obtained reliability increases as the obtained occurrence likelihood increases;

compare the obtained reliabilities of the plurality of picking target objects; and select an object, among the plurality of picking target objects, to be picked, based on the comparison of the obtained reliabilities of the plurality of picking target objects.

* * * * *